United States Patent (10) Patent No.: US 12,380,406 B1
Pearson et al. (45) Date of Patent: Aug. 5, 2025

(54) ADAPTIVE WORKSPACE ENVIRONMENT

(71) Applicant: Sykes Enterprises, Incorporated, Tampa, FL (US)

(72) Inventors: David Pearson, Tampa, FL (US); J. Shelton Hook, Jr., Tampa, FL (US); Eric G. Palacio, Tampa, FL (US); Richard Sadowski, Tampa, FL (US); Stephen Berdy, Tampa, FL (US); Joseph Flaska, Tampa, FL (US); James Somers, Tampa, FL (US); J. Brooke Aker, Tampa, FL (US); Ryan R. Cannon, Tampa, FL (US)

(73) Assignee: Sykes Enterprises, Incorporated, Tampa, FL (US)

( * ) Notice: Subject to any disclaimer, the term of this patent is extended or adjusted under 35 U.S.C. 154(b) by 627 days.

(21) Appl. No.: 16/938,537

(22) Filed: Jul. 24, 2020

Related U.S. Application Data

(63) Continuation-in-part of application No. 16/908,280, filed on Jun. 22, 2020, now Pat. No. 11,699,113, and a continuation-in-part of application No. 16/170,504, filed on Oct. 25, 2018, now Pat. No. 10,748,099, and a continuation-in-part of application No. 15/402,210, filed on Jan. 9, 2017, now abandoned.

(51) Int. Cl.
*G06Q 10/10* (2023.01)
*G06F 9/451* (2018.01)
*G06Q 30/02* (2023.01)
*H04M 3/51* (2006.01)
*H04W 4/029* (2018.01)

(52) U.S. Cl.
CPC .......... *G06Q 10/103* (2013.01); *G06F 9/451* (2018.02); *G06Q 30/0281* (2013.01); *H04M 3/5141* (2013.01); *H04W 4/029* (2018.02)

(58) Field of Classification Search
CPC . G06Q 10/103; G06Q 30/0281; H04W 4/029; G06F 9/451; H04M 3/5141
See application file for complete search history.

(56) References Cited

U.S. PATENT DOCUMENTS 6,021,428 A * 2/2000 Miloslavsky ...... G11B 20/1833
348/E7.083
6,047,060 A 4/2000 Fedorov et al.
6,493,447 B1 * 12/2002 Goss ..................... H04L 65/401
709/203
7,249,192 B1 7/2007 Brewer et al.
(Continued)

*Primary Examiner* — Kannan Shanmugasundaram
(74) *Attorney, Agent, or Firm* — Jeffrey B. Fabian; Shumaker, Loop & Kendrick, LLP

(57) ABSTRACT

Disclosed are systems and methods that ingest substantial volumes of data from a variety of sources associated with a computing system network to create integrated, intuitive, efficient, and coherent adaptive workspace display interfaces. The ingestion includes event data generated by event source software applications running on end user computing devices as well as call and end user attribute data that is used to determine state, presence, and performance data for the end user computing devices that is formatted for display on the adaptive workspace interfaces and used during performance monitoring and collaboration between system end users. The adaptive workspace interfaces provide functions that facilitate real time collaboration between end users that enhances shared experiences between system end users and customers.

13 Claims, 18 Drawing Sheets

(56) References Cited

U.S. PATENT DOCUMENTS

| | | |
|---|---|---|
| 7,805,510 B2 | 9/2010 | Bansal et al. |
| 8,531,501 B2 | 9/2013 | Portman et al. |
| 8,565,413 B2 | 10/2013 | Curley et al. |
| 9,014,364 B1 | 4/2015 | Koster |
| 9,100,484 B1 | 8/2015 | Kleck et al. |
| 9,106,736 B1 | 8/2015 | Slovacek |
| 9,413,891 B2 | 8/2016 | Dwyer et al. |
| 9,584,515 B2 | 2/2017 | Hayton et al. |
| 9,961,519 B1 | 5/2018 | Ashe |
| 9,992,198 B2 | 6/2018 | Bao et al. |
| 10,171,319 B2 | 1/2019 | Yadav et al. |
| 10,346,620 B2 | 7/2019 | Sgambati et al. |
| 10,728,392 B1 | 7/2020 | Chandrakant et al. |
| 10,742,649 B1 | 8/2020 | Hook, Jr. et al. |
| 10,748,099 B1 | 8/2020 | Sadowski et al. |
| 11,699,113 B1 | 7/2023 | Pearson et al. |
| 2003/0091028 A1* | 5/2003 | Chang ............... H04M 7/0057 370/352 |
| 2006/0203815 A1 | 9/2006 | Couillard |
| 2008/0019500 A1 | 1/2008 | Torres et al. |
| 2009/0013255 A1 | 1/2009 | Yuschik et al. |
| 2012/0130771 A1 | 5/2012 | Kannan et al. |
| 2013/0103656 A1 | 4/2013 | Sanchez Loureda et al. |
| 2013/0268606 A1 | 10/2013 | Jindal |
| 2014/0143018 A1 | 5/2014 | Nies et al. |
| 2014/0270104 A1* | 9/2014 | O'Connor ......... H04M 3/42221 379/85 |
| 2015/0195406 A1* | 7/2015 | Dwyer ............... G06F 21/6254 379/265.07 |
| 2017/0330147 A1 | 11/2017 | Hook et al. |
| 2018/0234550 A1* | 8/2018 | Lifson .................... H04L 12/12 |
| 2021/0406806 A1 | 12/2021 | Sadowski et al. |
| 2022/0377175 A1 | 11/2022 | Dwyer et al. |

\* cited by examiner

Filters                                                                    ✕

Filter By Agent:  [                              ]

Filter By Site:   [ Glorietta
                    Langhorne - 800 Town Center
                    San Jose -                   ]

Filter By Leader: [ Supervisor 1
                    Supervisor 2
                    Supervisor 3                 ]

Offline Agents:   [ Show                       ⌄ ]
Include:          [ All Agents                 ⌄ ]

[ Ok ] [ Cancel ]

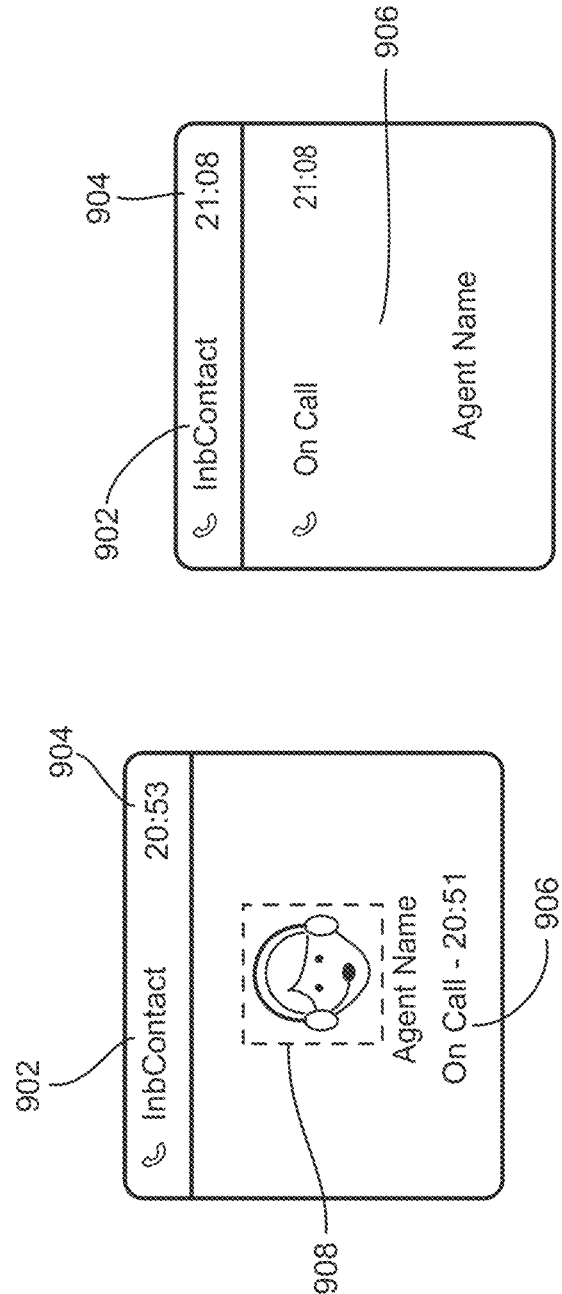

ADAPTIVE WORKSPACE ENVIRONMENT

CROSS REFERENCE TO RELATED APPLICATIONS

This application is a continuation-in-part of, and claims priority from: (1) copending U.S. nonprovisional application Ser. No. 15/402,210 filed on Jan. 9, 2017, the entirety of which is incorporated herein by reference, which itself claims priority to U.S. provisional Application No. 62/276,179 filed Jan. 7, 2016; (2) copending U.S. nonprovisional application Ser. No. 16/908,280 filed on Jun. 22, 2020, the entirety of which is incorporated herein by reference; and (3) copending U.S. nonprovisional application Ser. No. 16/170,504 filed on Oct. 25, 2018, the entirety of which is incorporated herein by reference.

TECHNICAL FIELD AND BACKGROUND

The present invention relates generally to the field of real-time electronic monitoring and collaboration among system end users, and more particularly, to integrated graphical user interfaces that display a wide variety of end user performance metrics, attributes, and state information and that further include functions that facilitate collaboration between end users to facilitate rendering electronic, remote assistance to agents efficiently and effectively.

Existing methods for monitoring the performance of system end users rely on limited subsets of data available through disparate systems, software applications, and interfaces. Furthermore, there are a limited number of ways in which end users can collaborate to render assistance to one another, and such collaboration also frequently relies on the use of multiple types of systems, software, and interfaces. Existing electronic monitoring techniques also do a poor job at capturing useful, cohesive data from such disparate systems and software applications. As a result, the task of monitoring and assisting end users is inefficient, does not rely on a complete and accurate picture of shared experiences between agents and customers, and requires substantial investments in end user training for the various systems, software, and interfaces.

To illustrate with respect to a call center where agents are tasked with assisting customers, a supervisor might be required to utilize one system to monitor which agents are engaged in a shared experience with a customer, a second system to monitor agent performance (e.g., number of calls answered, average handle time, sales, etc.), and a third system to look up information about the agent's background and experience (e.g., agent tenure, training, or expertise). In rendering assistance to end users, the supervisor might be limited to fielding calls from agents or responding to instant messages and emails, and a significant burden is placed on end users to reach out to find a supervisor or other end user available to assist after a problem has arisen during a shared experience. Significantly, the phone and messaging systems are often separate from the monitoring interfaces so that supervisors are required to continuously toggle between systems and interfaces even while rendering assistance to an agent. In call centers that support multiple types of products or lines of business, each product or line of business might itself require the use of multiple systems for monitoring agents, thereby increasing even further the number of systems and interfaces end users must manage.

It is, therefore, an object of the present invention to provide systems and methods that ingest the substantial volumes of enriched data available from various hardware or software applications associated with a computing system network to create integrated, intuitive, efficient, and coherent display interfaces. The improved display interfaces improve system end user performance monitoring by providing in real time an accurate and complete picture of what activities end user computing devices are performing and by providing critical insights into end user computing device states and end user attributes that can be used to proactively address problems before or as they arise during a shared experience between a customer and an end user. It is a further object of the invention to provide improved display interfaces that facilitate collaboration between system end users so that end users can render assistance quickly and efficiently, thereby improving performance and customer satisfaction during a shared experience.

SUMMARY

Disclosed are systems and methods for generating an adaptive workspace graphical user interface. In a first embodiment, the process for data inflow to the adaptive workspace environment includes a Presence application programming interface ("Presence API") receiving event data generated by an event source software application running on an end user computing device, any application programming interface or running on any computing service. The Presence API performs a state analysis that uses the event data to determine state data for the end user computing device(s) where the state data indicates a current status of the end user or end user computing device (e.g., On Call, Off System, etc.). An adaptive workspace point-of-presence ("AWS POP") software application also receives event data as well as the state data generated by the Presence API and ACD data generated by an Automated Call Distribution System ("ACD system"). The AWS POP software application performs a presence analysis utilizing the event data, state data, and the ACD data to determine presence data for the end user computing device(s) where the presence data considers historical state data as well as other factors to provide additional insight into the status and activities of the end user and end user computing device(s), as explained in more detail below.

The presence and other data are passed to the Adaptive Workspace environment where Workspace software code that can be made up of one or more software applications utilize the presence and other data to generate an adaptive workspace interface. Specifically, the Workspace software code receives the presence data from the AWS POP software application and end user attribute data stored to an ADA database. The ADA database functions as, or interfaces with, a service provider's personnel or human resource database that includes a variety of information about the end users. While the ADA Database is the source of the end user attribute data passed to the Workspace software code, some embodiments of the system can optionally include a Global Data Warehouse ("GDW") Database that functions as an intermediary storage facility for the end user attribute or other types of data. The GDW Database can enhance system operation by providing a secure, faster operating storage facility that periodically queries the ADA Database and stores the end user attribute or other data prompt transmission to the Workspace. The end user attribute data that is passed to the Workspace software code includes at least an end user name correlated to the end user computing device. The Workspace software code generates an adaptive workspace graphical user interface ("GUI") that includes a display tile representing the end user computing device. The display tile can include the presence data and the end user attribute data.

The adaptive workspace GUI can include various phone control functions that enable communication between, and control over, end user phone systems and interfaces (both physical devices and "virtual" software-based phones) to facilitate collaboration between end users. In one embodiment, the Workspace software code generates a Listen function that is displayed on the adaptive workspace GUI. Selection of the Listen function by an end user transmits a Listen request message to a computer telephony interface application programming interface ("CTI API"). The Listen request message can include a target end user identifier and a first end user identifier for the end user that initiated the request. The CTI API translates the Listen request message into a Listen command and formats the command in a manner that is readable by the ACD system. The CTI API transmits the Listen command to the ACD system. The ACD system processes the Listen command and transmits audio data from an ongoing telephone call in which the target end user is a participant to an audio interface of the first end user that initiated the request.

The adaptive workspace GUI can also include a Barge function. When selected by an end user, the Barge function transmits a Barge request message to the CTI API. The Barge request message can include a target end user identifier and a first end user identifier for the end user that initiated the request. The CTI API translates the Barge request message into a Barge command and formats the command in a manner that is readable by the ACD system. The CTI API transmits the Listen command to the ACD system. The ACD system processes the Barge command to connect the first end user telephone interface to an ongoing telephone call in which the target end user is a participant.

The adaptive workspace GUI can optionally include a Screen function to facilitate screen sharing where a first end user can view the desktop or display screen of another target end user computing device. Selecting the Screen function transmits a Screen request message to an OneWatch Server. The Screen request message includes at least a target end user computing device identifier and a first end user computing device identifier. In response to the Screen request message, the OneWatch Server transmits a screen share command to an End User Desktop OneWatch Application running on the target end user computing device. In response to the screen share command, the End User Desktop One-Watch Application transmits screen share video data to the OneWatch Server. The screen share data represents the desktop or display screen of the target end user computing device. Finally, the first end user computing device that initiated the request receives the screen share video data from the OneWatch Server.

In another aspect of the invention, the adaptive interface GUI can display a variety of performance data metrics relating to end user activities over a given time period, including, but not limited to, the number of calls received over a given time period, the number of calls placed on hold, the number of support requests submitted by an end user, and the average handle time of a customer interaction, among other performance data metrics. The performance data for a given end user or end user computing device is generated by an AWS Tile Feed software application through a performance analysis that utilizes the event data and ACD data. The performance data is passed to the Workspace software code, which incorporates the performance data into the adaptive workspace GUI.

In other embodiments of the invention, the adaptive workspace GUI can display various alerts to facilitate end user monitoring. As part of generating the alerts, an Alert Monitor software process receives the presence data from the AWS POP software application. The Alert Monitor software process includes Alert Rules Engine software code that processes the presence data to recognize one or more trigger conditions. The Alert Monitor software processes the presence data to generate alert data in response to the Alert Rules Engine software code recognizing a trigger condition associated with an end user computing device. The Workspace software code receives the alert data, and as part of generating the adaptive workspace GUI, the Workspace software code generates an Alert Indicator responsive to the alert data and incorporates the Alert Indicator into the adaptive workspace GUI. The Workspace software code can incorporate the Alert Indicator into the adaptive workspace GUI by a variety of display techniques, including, for example: (i) changing the color of the display tile for the end user computing device; (ii) changing the position of the display tile for the end user computing device; or (iii) incorporating an alert icon within the display tile for the end user computing device.

In another aspect of the invention, the adaptive workspace GUI can display clock monitor information in cases where end users are required to "clock in" as part of reporting to work or "clock out" as part of concluding a work shift. The AWS POP software application receives Clock Monitor event data generated by a Clock Monitor event source software application running on the end user computing device. The AWS POP software application conducts a presence analysis using the Clock Monitor event data to determine a Clock Monitor presence data value (e.g., "Clocked In" or "Clocked Out"). The Workspace software code receives the Clock Monitor presence data value and incorporates the Clock Monitor presence data value into the adaptive workspace GUI.

The Clock Monitor presence data can be utilized to generate alerts or implement functions that facilitate investigation and resolution of issues arising with end users clocking in or out for work. As part of generating alerts relating to the clock monitor information, an Alert Monitor software process receives presence data from the AWS POP software application, including the Clock Monitor presence data value. The Alert Monitor software process includes Alert Rules Engine software code that processes the presence data and the Clock Monitor presence data value to recognize trigger conditions. The Alert Monitor software process evaluates the presence data and the Clock Monitor presence data value to generate clock alert data in response to the Alert Rules Engine software code recognizing a trigger condition associated with the end user computing device. The Workspace software code receives the clock alert data as well as team roster data from the ADA Database. The team roster data includes a supervisor computing device identifier associated with the end user computing device where, for example, the supervisor has managerial responsibility over the end user. The Workspace software code processes the supervisor computing device identifier and the clock alert data, and can transmit a MicroTask to the supervisor computing device if required. The MicroTask can include software instructions that are to be performed by the supervisor computing device to require communication with the end user computing device. In this manner, the supervisor is tasked with investigating and potentially resolving problems with the end user clocking in or clocking out process.

Another feature of the invention detects potential idle conditions for end users that are logged into the system and/or clocked into work. A Secure Talk Desktop Agent (STDA) software process can monitor the end user desktops to detect potential activity, such as selection of software application interfaces, keystrokes, or mouse cursor movements. The STDA transmits the activity data (or lack of activity) as event data to a provider global transaction ingress system, which in turn passes the event data, or "activity event data," to the AWS POP software application. The AWS POP software application receives the activity event data generated by the STDA event source software application running on the end user computing device and performs a presence analysis using the activity event data to determine an activity presence data value. The Workspace software code receives the activity presence data value and generates the adaptive workspace GUI incorporating the activity presence data value by, for instance, displaying an "active" or "inactive" icon on a display tile for the end user.

One embodiment of the invention can include location checks to determine whether end users are authenticating or logging into a provider system from a potentially unauthorized location, which could indicate a security risk or non-compliance with provider remote work policies. While authenticating or logging into a provider system, a Login API can receive the end user computing device Internet Protocol ("IP") address as IP address data. The IP address data is passed to an Internet Protocol (IP) Location Lookup API. The IP Location Lookup API processes the IP address data to determine current location data for the end user computing device. A Compliance API receives both the current location data and expected location data from an ADA Database (i.e., a provider personnel or human resource database). The Compliance API performs a location analysis using the current location data and the expected location data. The location analysis uses Location Compliance Rules Engine software code to recognize the presence of a location trigger condition that generates location alert data. The Workspace software code receives the location alert data and generates the adaptive workspace GUI incorporating the location alert data.

In yet another feature of the invention, the system can evaluate end user availability to receive MicroTasks, which are discrete tasks outside the end user's standard work flow, such as training activities or requests to investigate and resolve alert conditions. The availability is evaluated in part by conducting a volume analysis by a Taskability API to determine availability data. The volume analysis considers anticipated volumes of incoming customer support requests as part of determining how many end users are needed in the near future and whether there is agent capacity to perform MicroTasks. The AWS POP software application receives the availability data as well as event data and the state data generated by the Presence API. The AWS POP software application processes the event data, state data, and availability data to determine presence MicroTask availability data for the end user computing device. The presence MicroTask availability data can include a list of end user or end user computing device identifiers that are deemed available to complete a MicroTask. The presence MicroTask availability data is received by Workspace software code along with the presence data. The Workspace software code incorporates presence MicroTask availability data into the adaptive workspace GUI.

In one embodiment of the invention, support requests from end users are routed to request recipient end users most suitable to respond to the support request. For instance, support requests from agent end users can be routed to a supervisor end user with whom the agent has a successful working relationship, as determined from evaluation of historical event data, survey data, or other relevant data sources. Support requests are routed using a Recommendation Matrix that includes a list of request recipient end users ranked according to suitability to answer the request. The Workspace software code receives a support request generated by the end user computing device. The Workspace software code processes the support request utilizing a Recommendation Matrix to determine a ranked list of two or more request recipient end user computing devices. The Workspace software code generates the adaptive workspace GUI in part by (i) generating a Support Request Indicator in response to the support request, (ii) incorporating the Support Request Indicator into the adaptive workspace GUI, and (iii) transmitting the adaptive workspace GUI that includes the Support Request Indicator to the highest ranked request recipient end user computing device according to the Recommendation Matrix.

In a further embodiment of the invention customer data is gathered by the system and displayed within the adaptive workspace GUIs. The customer data is gathered by, among other methods, an analysis of event data captured during customer interactions. The customer data can include a customer name, a customer location, the products subject to a customer support request, or other relevant information. A Customer Tiles API receives the event data generated by a customer data event source software application running on the end user computing device. The customer data event source can be a STDA that captures end user activity during a customer interaction or a Customer Relationship Management software tool that receives customer information entered by an end user as part of a customer interaction. The Customer Tiles API processes the event data to determine customer data. The Workspace software code receives the customer data and incorporates the customer data into the adaptive workspace GUI. The customer data can be displayed, for instance, as a collection of tiles or through other means known to those of skill in the art.

In one embodiment of the invention, a method for generating an adaptive workspace graphical user interface is provided that relies on a single application, the AWS POP software application, to determine the presence data by incorporating the state analysis within the presence analysis. The AWS POP software application receives the event data generated by an event source software application running on an end user computing device. The AWS POP software application performs a presence analysis utilizing the event data and ACD data to determine presence data for the end user computing device. The Workspace software code receives the presence data from the AWS POP software application and end user attribute data from the ADA database where the end user attribute data includes an end user name correlated to the end user computing device. The Workspace software code generates the adaptive workspace GUI that includes a display tile for the end user computing device. The display tile incorporates the presence data and the end user attribute data.

In yet another embodiment, the presence data is determined by an analysis of just the event data. This can occur, for example, where (i) customer interactions occur through other means, such as instant messaging, or (i) a call data is passed through a provider's global transaction interface system as event data without the need for a separate interface to an ACD system. A provider system or processor receives event data generated by an event source software application running on an end user computing device and also receives end user attribute data stored to the ADA database. The end user attribute data includes an end user name correlated to the end user computing device. The processor performs a presence analysis utilizing the event data to determine presence data and for the end user computing device. The processor generates an adaptive workspace GUI that includes a display tile for the end user computing device where the display tile incorporates the presence data and the end user attribute data.

BRIEF DESCRIPTION OF THE DRAWINGS

Features, aspects, and advantages of the present invention are better understood when the following detailed description of the invention is read with reference to the accompanying figures, in which:

FIG. 6 illustrates an example Filters graphical user interface.

FIG. 7 illustrates an example Options graphical user interface.

FIG. 8 illustrates an example Extension & Switch Configuration graphical user interface.

FIG. 9A illustrates an example end user tile.

FIG. 9B illustrates an example end user tile.

FIG. 16 illustrates an example Alerts Maintenance interface.

FIG. 17 illustrates an example Coaching interface.

DETAILED DESCRIPTION

Figure 1:
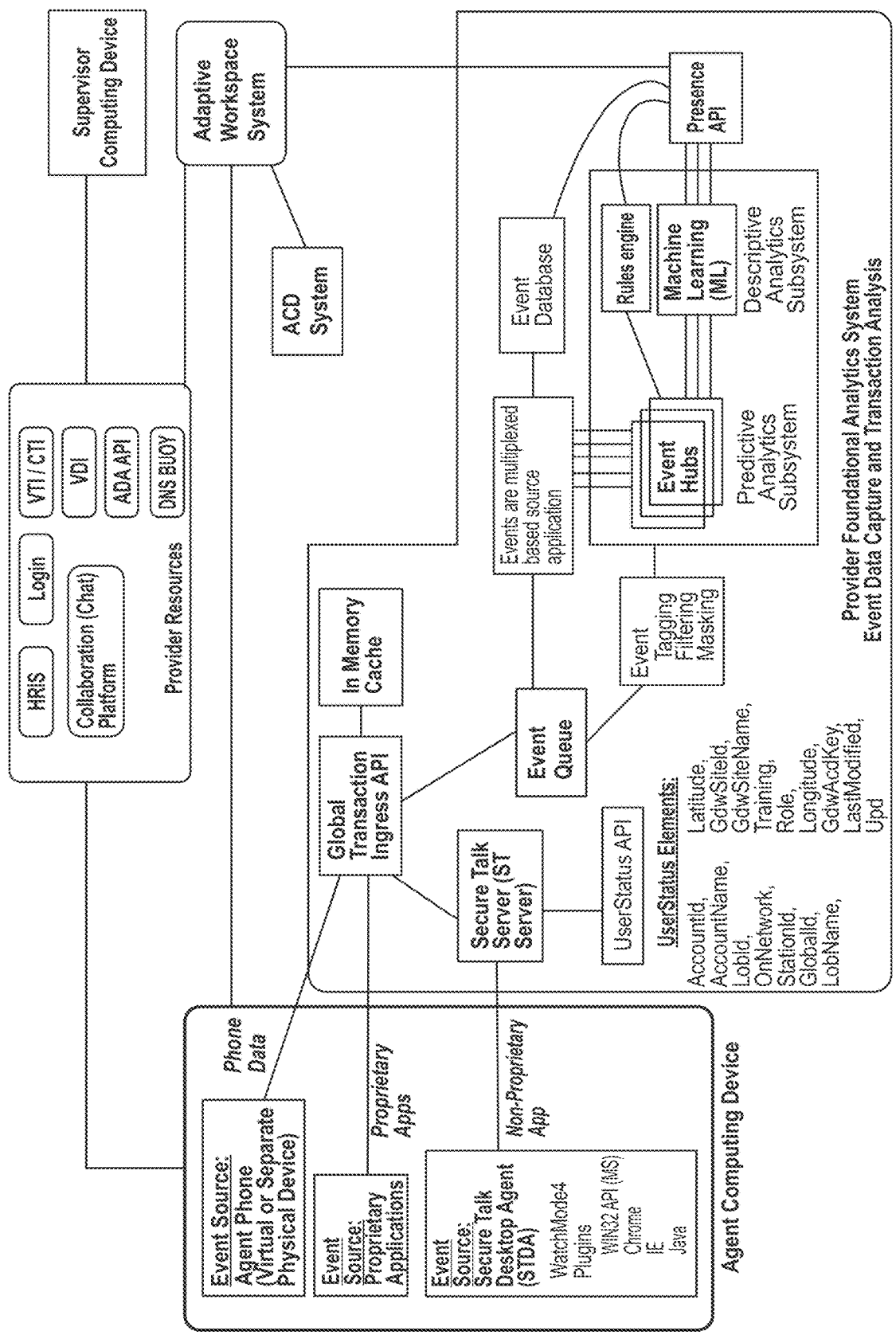
FIG. 1 is an exemplary system diagram according to one embodiment.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole as would be appreciated by one of ordinary skill in the art. The nomenclature utilized to designate various devices and software applications is not intended to be limiting, and reference to a device or application with a particular commercial, proprietary, or other name can be construed to encompass other devices and applications that perform a similar function or have a similar structure.

As used herein, the term provider generally describes the person or entity providing customer support and service. The term "customer support" is used interchangeably with the terms support, customer service, customer interaction, or "shared experience" and generally includes, but is not limited to, providing customers with assistance in utilizing existing products and services and with purchasing additional products and services. The term "client" is used to generally denote a separate business entity from the service provider. Customers of the client are provided support by the service provider on behalf of the client; in other words, the provider is operating as a third-party provider of customer support services for the client.

The term "agent" generally describes an individual who interfaces with the customer to provide customer support using the systems and methods described herein, and the term is used interchangeably with the term representative. The term "supervisor" generally denotes provider personnel with managerial responsibility over one or more agents, who has broader permissions or access rights to the systems, tools, and features, described herein, and who is tasked with monitoring and assisting with agent performance of customer service activities. The term "end user" is used to describe an agent, supervisor, or other provider personnel that utilizes the disclosed systems and methods. The term "end user computing device" refers to a virtual (e.g., virtual desktop) or physical computing device (e.g., desktop, laptop, tablet, etc.) that is used by an agent, supervisor, or other provider personnel to access and use the systems and perform the inventive methods disclosed in this specification.

The embodiments discussed in this disclosure are described with reference to adaptable workspaces and interfaces utilized for customer service interactions or shared experiences that take place in a call-center environment. However, those of ordinary skill in the art will appreciate that the disclosed systems and methods are applicable to providing adaptable workspaces and interfaces generally that enable real-time monitoring and collaboration.

Provider Systems

As shown in FIG. 1, an example provider system includes: (i) one or more agent computing devices; (ii) provider platform resources; (iii) one or more supervisor computing devices; (iv) a foundational analytics system; (v) an Automated Call Distribution System ("ACD system"); and (vi) an Adaptive Workspace System ("AWS"). The embodiment shown in FIG. 1 is not intended to be limiting, and one of ordinary skill in the art will recognize that the system may be implemented using a variety of suitable hardware or software configurations. For instance, the system could be implemented using separate computing systems or servers to implement one or more of the provider resources shown in FIG. 1, such as separate servers for the Virtual/Computing Telephony Interface software platform ("VTI/CTI") and the Virtual Desktop Interface ("VDI") software platform, or one or more of the provider resources can be implemented using the same server computing device as the foundational analytics system.

The various system components are generally implemented by software applications running on one or more physical or virtual computing devices (e.g., a virtual desktop application). To illustrate, in one embodiment, the various event sources for the foundational analytics system are implemented by software applications that run on a physical agent computing device in communication with the GTI API running on a separate server computing device. Alternatively, the event sources can be implemented as software applications running on a virtual computing device that is in turn running on the same physical computing device as the GTI API. The computing devices may also utilize software applications that function using resources available through a third-party provider, such as a Software as a Service ("SasS"), Platform as a Service ("PaaS"), or Infrastructure as a Service ("IaaS") provider running on a third-party cloud service computing device. For example, a cloud computing device may function as a resource provider by providing remote data storage capabilities and SaaS capabilities that implement the various software applications under the provider resources.

The physical computing devices for the provider system can be implemented as laptops, desktop computers, tablet computers, or network computing devices, such as servers. The computing devices may include a processor that communicates with a number of peripheral subsystems via a bus subsystem. These peripheral subsystems may include a storage subsystem, user-interface input devices, user-interface output devices, a communication system, and a network interface subsystem. By processing instructions stored as integrated software code or applications on one or more storage devices, the processors provide graphical user interfaces ("GUI"), permit communication with other electronic devices, and generally perform the steps of the present methods and implement the present systems.

Exemplary GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

Turning again to FIG. 1, through the provider platform resources, the agent and supervisor computing device can access various software applications available through the provider platform, including, but not limited to, human resource ("HRIS") software applications, a Login Application Programing Interface ("API"), a virtual telephony interface software platform, a computer telephony interface system, collaboration software applications (e.g., chat or real-time messaging applications), a virtual desktop interface ("VDI") software application, an Active Directory/ADA Application Programing Interface ("API"), and a DNS Buoy software application, among many other types of hardware and software resource.

The Adaptive Workspace System is implemented by one or more software processes and database that configure various GUIs for display by the agent computing devices and supervisor computing devices depending on the permissions or roles assigned to the particular devices. The permissions can be determined upon authentication or logon of the end user computing device to the provider system. The end user computing devices are authenticated using techniques such as entry of login credentials (e.g., user names and passwords), biometric information, hardware identifiers (e.g., IP addresses and hashed values of system identifiers), and multi-factor authentication. Authentication occurs in part through communication between the end user computing device and an active directory software application. A more complete description of the systems and methods that can be used to authenticate an end user computing device to a provider system can be found in Applicant's pending patent application Ser. No. 15/852,732 the entirety of which is incorporated herein by reference.

If the device authentication is successful, the ADA API determines what systems, applications, adaptive workspaces, and provider resources should be made available to the end user computing device. The ADA API is an identity management service ("IdM") that includes an ADA Database associating each agent, supervisor, or other user with a predefined set of permissions. The ADA API accesses the ADA Database and returns a user permissions message containing permissions data that is transmitted to the end user computing device. The ADA Database can also include a variety of end user attribute data, such as human-resource type personnel data like an end user's location, skill level, status as a remote agent, biographical information, or other relevant information.

In one embodiment, the permissions specify the provider clients, client products and service (i.e., line of business or "LOB"), and job functions or roles that an agent or supervisor is authorized to access or perform for a particular client. In this manner, the system ensures that end user computing devices have limited access to authorized clients and lines of business. To illustrate, in cases where a provider client supports four different products, a first agent might be trained in only two of those products and have a relatively short tenure (i.e., minimal experience) and be assigned a role of "junior" agent that fields support requests for only those two products. A second agent having a longer tenure and training in all four products might be assigned the role of "senior" agent such that support requests for all four products or that have higher complexity are routed to that agent. In yet another example, an end user could be assigned a supervisor role such that the end user has accesses to additional features and interfaces, as described more fully below.

Upon authentication to a provider network and receipt of the user permissions message, the end user computing device can receive from the provider system a Workportal interface for display. The Workportal interface can serve essentially as a home screen from which the end user computing device can navigate to various provider applications, interfaces, or other resources. Among the functions selectable from the Workportal interface, the computing device can select from one or more available job functions or role, such as serving as an agent or supervisor for a given provider site, client, or line of business. Selection of a role results in the end user computing device transmitting a role selection message to the provider system, including the Adaptive Workspace System, that defines the functions and interfaces available to that end user computing device.

As part of the authentication process when an end user computing device logs into a provider system, a Buoy Check process can be performed to determine whether the end user computing device is running within a provider network (i.e., running as part of the provider Local Area Network) or running remotely connected to the provider network through a VDI or Virtual Private Network ("VPN") connection. After receiving a role selection message, the provider system transmits a command to the end user computing device that causes the computing device to ping a DNS Buoy application running on the provider system. If the end user computing device is running on the provider network (e.g., an onsite agent computing device in a call center), then the computing device will receive a ping response that can be reported to a login process running on the provider system. If the end user computing device is not running on the provider network (e.g., a remote agent computing device), then the computing device will not receive a response from the DNS Buoy. Those of skill in the art will appreciate that other means of determining whether an agent computing device is on the network may be used. For example, the provider system may transmit to the DNS Buoy application an IP address for the end user computing device, and the DNS Buoy performs a lookup to determine if the received IP address is presently listed as being connected to a provider local network.

The Adaptive Workspace System may make particular Adaptive Workspace environments available to the end user computing devices depending on the permissions data and depending on client preferences. The Adaptive Workspace System environments are customizable in that each provider client may utilize one or more various Adaptive Workspace environments that provide customizable GUIs ("AWS GUIs" or "AWS interfaces") for the adaptive, or customizable, display of data and functions useful for providing customer support and enhancing collaboration between and among provider agents, supervisors, and other personnel. For instance, a provider client might have different lines of business, such as selling a line of cameras and a line of printer products. In that case, the client has the option of establishing an Adaptive Workspace environment for one or both lines of products. The client may also customize the Adaptive Workspace interfaces and available functions separately for each line of business. The data displayed by the Adaptive Workspace System is in large part captured by the provider foundational analytics system described in more detail below.

Capturing Event Data for the Adaptive Workspace Environment

The provider foundational analytics system captures a wide variety of event data and information that represents a shared experience interaction between a provider and a customer of a product or service. Event data can include, but is not limited to: (i) video recording data of a customer interaction, such as a recording of an end user's computing device display screen or desktop captured and stored during a customer interaction that provides insight into what tasks and functions the agent was performing during the customer interaction; (ii) audio data of dialog between a customer and provider personnel, including a recording of a customer call; (iii) written transcript data of communications between provider personnel and a customer, including a transcript of audio data representing spoken discussions, email exchanges, or instant chat messages; (iv) user data entered by an end user during a shared experience; and (v) event data gathered from various event sources, such as an end user's telephone device or computing device. In some cases, event data can include video data, audio data, written transcript data, or user data when, for example, an email sent by an agent is captured from an email software application event source or user data entered by an agent is captured from a database software application event source utilized by an agent.

Event data generally includes data generated by the end user's computing device as well as data generated by other event sources. Event sources can be hardware components (e.g., a desktop computer or telephone) or software applications (e.g., Internet browser or a background operating system process) that are utilized during a shared experience. The event data can include written transcript data such as emails and chat communications with a customer or other agents generated using an email or chat software application event source. Event data can also include audio data captured by a physical or virtual telephone or audio data captured by another software application, such as a remote virtual meeting software application. The audio data can also be converted to written transcript data for further processing.

Event data can include data generated by event sources that are separate from an end user's computing device or separate from an end user's desktop, such as communications from other provider personnel, communications or other data from Chat Bots or Knowledge Bots, or data generated when an agent participates in training in a different desktop environment than the environment utilized by an agent during a shared experience. The event data is captured synchronously (e.g., at periodic intervals) and asynchronously as events or actions occur (e.g., when an agent performs an action).

As shown in FIG. 1, an example provider foundational analytics system configuration according to one embodiment includes: (i) multiple categories of event sources; (ii) a global transaction ingress application programmable interface ("GTI API") running on a first server; (iii) a Secure Talk application running on a second server ("ST Server"); (iv) a User Status API; (v) a Memory Cache; (vi) an Event Queue; (vii) an Event Database; (viii) a Presence API; (ix) an Event Hub; (x) a Rules Engine; and (xi) a Machine Learning Engine.

The event sources communicate with the GTI API either directly or through the ST Server. The GTI API correlates and associates related events into transactions that represent one or more activities or actions performed to accomplish a given task. In this manner, the foundational analytics system gathers data relating to individual actions performed by an end user or end user computing device and provides insight into how the end user devices are utilized to accomplish a given task or transaction over time as part of a shared experience between a provider agent and a customer. A description of the processes and devices used in capturing event data and organizing the data into transactions is also found in Applicant's pending patent application Ser. No. 16/170,504 the entirety of which is incorporated herein by reference.

The system can accommodate multiple types of event sources in various configurations. As an example, the phone event source shown in FIG. 1 can be implemented as a separate hardware telephone device connected to CTI system or as a virtual telephony interface VTI that runs as a software application on a physical or virtual end user computing device. Multiple software applications serving as event sources can run on a single agent computing device. The system will generally include a plurality of agent computing devices where each agent computing device implements multiple event sources.

The event sources capture event data that represents various activities occurring at the agent computing device as well as other useful information. The system can utilize any suitable number and type of event sources that are configured to capture event data and transmit the event data to the GTI API either directly or through the ST Server in an event data packet format. The event data can be transmitted using JavaScript Object Notation ("JSON") or any other suitable format. The event data packets are transmitted to the GTI API asynchronously as each event occurs to ensure real-time capture of relevant event data as opposed to sending the event data in event data packets at periodic or predetermined intervals.

The available data fields and content for the event data packets is customizable and will generally vary depending on, among other things, the event source application. Exemplary event data fields include, but are not limited to: (i) time and date data; (ii) an event identifier that can be used to determine the activity represented by the event data; (iii) an event type representing the category of activities represented by the event; (iv) one or more indicator flags indicating whether the event is a start event, end event, or neither; (v) an endpoint identifier such as an event source identifier that identifies the software application originating the corresponding event data; (vi) an endpoint identifier such as an event source user identifier User Principle Name ("UPN") used by the event source to identify the current end user of the event source application or the agent computing device, which can be, for instance, a username, employee number, or other identifier entered by the end user when logging into the agent computing device or into the software application that serves as the event source; (vii) a global user identifier ("GUID") that identifies the end user of the agent computing device and that is independent of the software applications or computing devices being utilized; (viii) a source record identifier that identifies a unique record in the event source application and that can be utilized by the Predictive Analytics or other application to lookup additional information in the source application's database about the event; (ix) a global transaction identifier ("GTID") discussed in more detail below; (x) a client account identifier and a line of business identifier that can be used by a service provider to identify a client or industry being served by the activities of end user and agent computing device; and (xi) any information available from the event source that is useful for real-time monitoring or analytics.

As shown in FIG. 1, the phone event data is captured and transmitted directly to the GTI API in real time. The phone event source can capture event data such as, a start call event, an end call event, or an on-hold event indicating that an ongoing telephone call has been placed on or taken off hold.

The system can also include various proprietary and non-proprietary software applications running on the agent computing devices. Non-proprietary or commercial software applications running on the agent computing devices can include, for instance, the computing device operating system software (e.g., Microsoft Windows®), Java® virtual machine, or Internet browser applications (e.g., Google Chrome® or Internet Explorer®). The proprietary and non-proprietary software applications capture event data such as text entered in a graphical user interface, the selection of an input function that initiates a keyword search in an Internet browser, or sending a communication through an instant "chat message" software application.

Proprietary software applications can be designed and preconfigured to asynchronously capture event data in real time for transmission directly to the GTI API. Non-proprietary applications, however, might not be configured to permit the asynchronous capture and transmission of event data. The system shown in FIG. 1 illustrates the use of a Secure Talk Desktop Agent ("STDA") software application running on the agent or other end user computing device to interface with various non-proprietary applications (e.g., the Win32 API for Windows®) to enable the capture and transmission of event data.

The STDA application may establish a protocol for reading the particular output of the non-proprietary software application and translating the output into a JSON packet for transmission to the GTI API. Alternatively, where a protocol for reading the output of a non-proprietary software application cannot be established, the STDA may utilize techniques such as "screen scraping" that captures human-readable outputs from the non-proprietary application intended for display on a monitor. The STDA application can be configured to read a variety of information occurring on the end user computing device desktop, including, but not limited to, capturing keystrokes, mouse movements, toggling between open "windows" or software application interfaces, opening software applications, or selecting various functions on the software applications (selecting buttons, pull down menus, entering text, etc.). The STDA can capture not just the particular actions taken but also identify the software applications opened or used and the type of inputs or functions selected, such as recognizing that a function was selected to initiate a search, submit information to a database, play an audio file, among many other examples.

The STDA or other event sources may transmit the captured event data to the GTI API directly or through the ST Server, as illustrated in FIG. 1. Transmission of event data through the ST Server or another intermediary device distributes the required processing of event data over multiple network layers and devices. This has a particular advantage for networks with a large number of agent computing devices or a large number of event sources as the GTI API might not be capable of processing event data transmitted in real time from hundreds or even thousands of event sources. Event data processing functions, such as data enrichment, can be performed in whole or in part by the intermediary ST Server or another computing device running a User Status API. Other embodiments may utilize multiple GTI APIs to handle incoming event data.

The event data is enriched by appending one or more user status elements to the event data. The ST Server queries the User Status API using the UPN, and the User Status API returns information relating to the end user that is then appended to the event data as user status elements before transmission to the GTI API. In some embodiments, the GTI API can perform the data enrichment function. Or alternatively, the data enrichment can be performed by the event source software application itself prior to transmission to the GTI API or the ST Server, as illustrated in FIG. 1 where the proprietary applications event source is preconfigured to generate site, account program, and line of business ("SAPL") data that is sent with the event source data to the GTI API. The generated SAPL data can also be utilized to properly direct transmission of the event data to a particular GTI API in embodiments where multiple GTI APIs are utilized. So, for example, all event data coming from particular provider sites can be directed to a dedicated GTI API for those sites.

In the context of a call center where the end users are provider agents fielding consumer calls regarding various products or services provided by various clients, the user status element data can include: (i) a client account name and identification number for the client; (ii) a line of business identifier for the call service provider (i.e., a given industry or category of products); (iii) an agent computing device identifier; (iv) an end user role designation (i.e., junior agent, senior agent, supervisor, etc.); (v) geographic location data for the provider end user; (vi) a site identifier if the provider end user is working from a given provider location or office; (vii) an "on-network" flag indicating whether the provider end user is working remotely or from within a provider location; or (viii) or any other information useful to the provider. In this manner, the event data is enriched so as to provide insight beyond just what activities occurred at the end user computing device. So, for instance, a provider could then determine whether end user at a particular location or working for a particular client answer more calls (i.e., more start call events) or spend more time per call (i.e., time between start call event and end call event) than end users at other locations or working for other clients.

Figure 2:
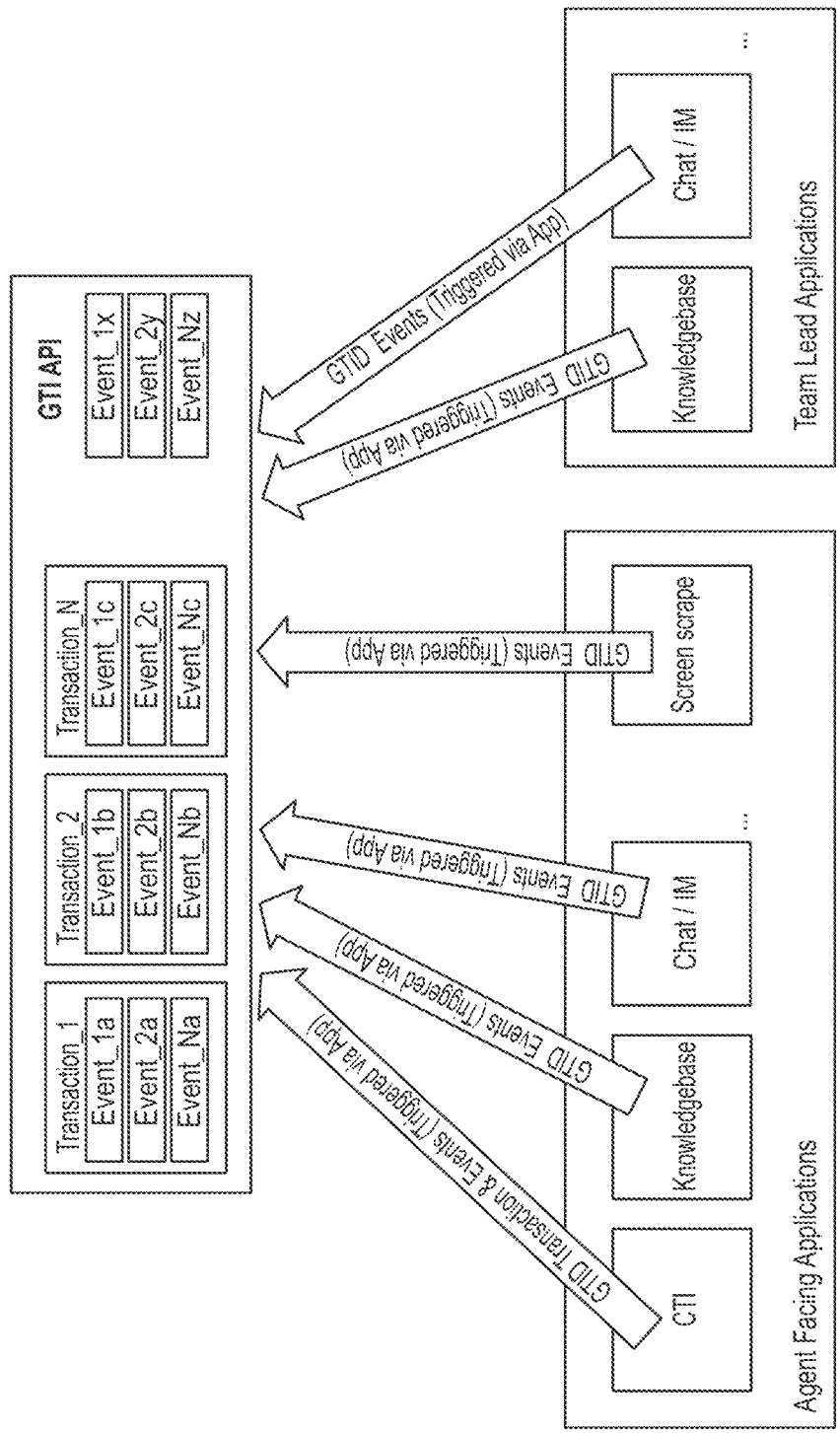
FIG. 2 depicts discrete transactions comprising event data from multiple sources.

Following enrichment and receipt of event data, the GTI API performs a transaction analysis that correlates the event data into transactions that represent a series of related activities performed by the end user computing device to accomplish a particular task. The correlation of event data into transactions is depicted in FIG. 2 where various event source software applications (e.g., CTI, Knowledgebase, Chat/Instant Message) transmit event data, or "GTID Transaction & Events," to the GTI API. The GTI API then correlates the events into separately identified transactions (i.e., Transaction_1, Transaction_2, . . . Transaction_N).

Figure 3:
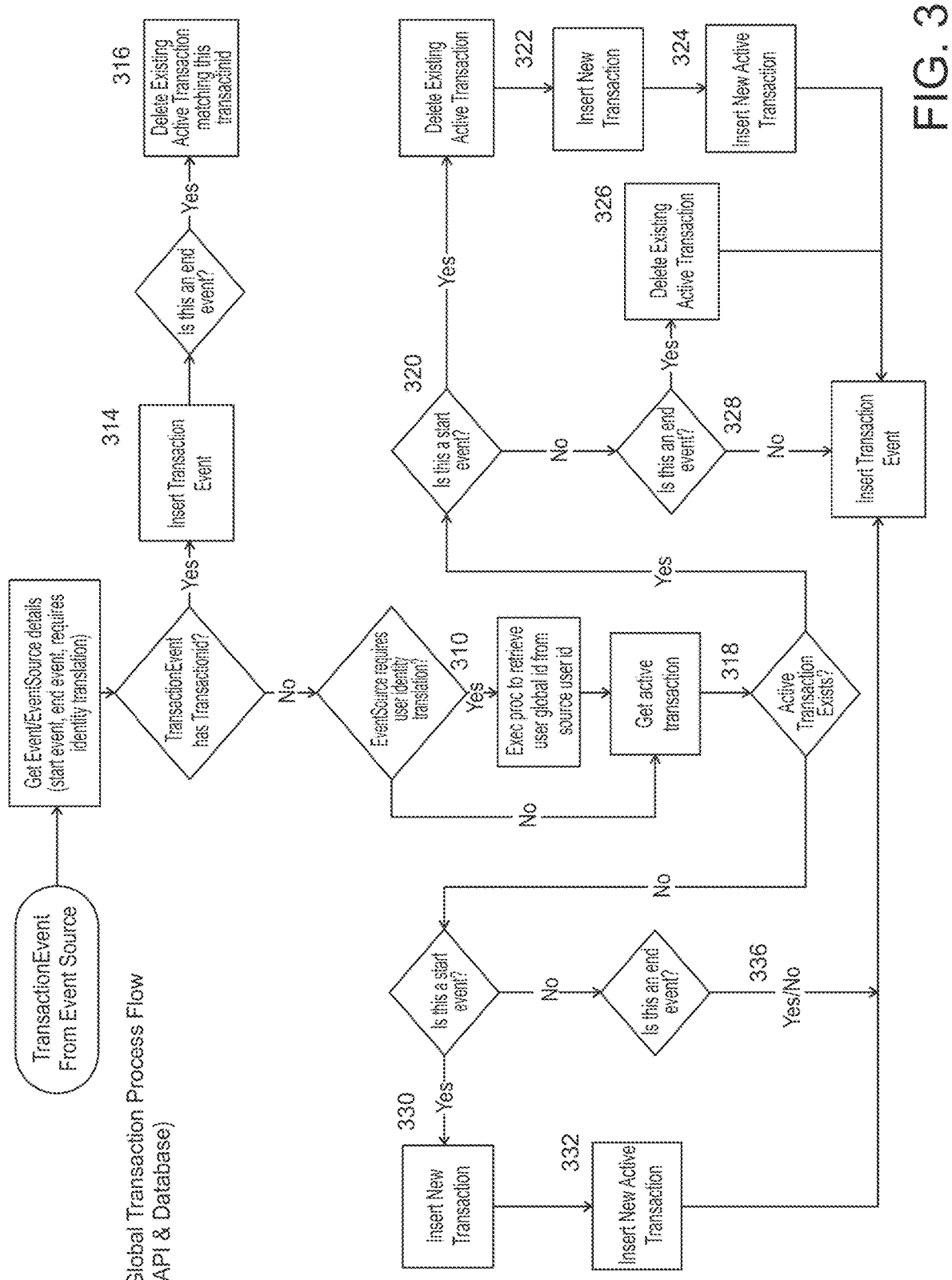
FIG. 3 illustrates an exemplary process for correlating received event data into transactions.

FIG. 3 illustrates an exemplary GTI API process flow for a transaction analysis that correlates event data into transactions. The event data can be correlated into transactions by, for example, associating a transaction identifier with the event data by appending the transaction identifier to the event data or associating the event data with a particular transaction identifier in a relational database. To facilitate the correlation, certain events can be designated by the event sources as start events or end events signaling the beginning or end of a transaction. In a call center, for example, many transactions will focus on the receipt and handling of customer phone calls. Thus, answering the phone can be designated as a start event and hanging up the phone can be designated as an end event. On receiving event data from an event source, the GTI API determines both the UPN and whether the event data represents a start event or end event. The event can also be designated as an intermediate event within the transaction, or the lack of a start event or end event designation can be interpreted as the event data representing an intermediate event.

The GTI API utilizes the UPN to query the Memory Cache, which can be implemented as a database that includes a table of open global transaction identifiers ("GTID") and the associated UPN. This permits the GTI API to determine whether there is an open transaction for received event data. In some systems, the various event sources may utilize different event data fields and formats. To accommodate disparate event data formats, the GTI API may be required to translate 310 the UPN. So, for instance, a phone event source may utilize the end user's extension as the UPN. The GTI API performs a translation 310 by querying a separate database using the phone extension and in turn receives a UPN that can be used by the GTI API to query the Memory Cache.

Turning again to FIG. 3, if the event data received by the GTI API already includes a GTID 312, then an open transaction exists. The GTI API "inserts" 313 the event data into the open transaction by associating the open GTID with the received event data. If the received event data represents an end event, the GTI API deletes 316 the GTID from the Memory Cache. When the received event data does not include an open GTID, the event data UPN is translated 310, as necessary, and the GTI API queries 318 the Memory Cache to determine whether an open GTID exists. If the Memory Cache returns an open GTID but the event data represents a start event 320, the GTI API will delete the current open GTID from the Memory Cache and create a new open GTID that is associated 322 with the received event data. The new open GTID is stored to the Memory Cache 324, and the event data and associated GTID are stored to the Event Que. In this manner, the system ensures that each end user or agent computing device is associated with at most one open transaction at all times as the receipt of a start event while an open GTID exists could indicate that the GTI API did not properly receive or process a previous end event.

When the Memory Cache query returns an open GTID and the event data represents an end event, the GTI API will delete 326 the open GTID from the Memory Cache and store the event data to the Event Queue. Otherwise when the Memory Cache query returns an open GTID and the event data does not represent a start or end event, the transaction remains open and the GTID remains stored to the Memory Cache while the event data is associated with the open GTID and the event data and associated GTID are stored 328 to the Event Queue.

When the Memory Cache query does not return an open GTID (i.e., there is no record of an open transaction for that end user) and the event data represents a start event, the GTI API opens 330 a new transaction by creating a new open GTID and storing the new GTID to the Memory Cache 332. The event data is "inserted" into the transaction by associating the new GTID with the event data. The event data and associated GTID are stored to the Event Queue. Otherwise, when the Memory Cache query does not return an open GTID and the event data does not represent a start event, the GTI API creates a new GTID and stores the event data and associated GTID to the Event Queue without storing the GTID to the Memory Cache 336. Thus, the event data is treated as the only event comprising that transaction and subsequent event data associated with that UPN will be treated as a new transaction.

Determining transactions based on event data can be illustrated with the following simplified example for an exemplary transaction occurring at a call center that begins with a call answer event using a CTI phone event source. The call answer event is designated as a start event and transmitted to the GTI API where it is associated with an existing open transaction (if one exists) corresponding to the end user's identifier/UPN. The call answer event can be followed first by a send chat event and then by a receive chat event using an instant messaging chat application. The send and receive chat events are transmitted to the GTI API, and the user identifiers (UPN) for both the message sender and the message recipients can be used to query the Memory Cache for the existing open GTID and associated with the corresponding GTID. Lastly, the call center end user ends the call, which prompts the CTI event source to generate an end call event that is transmitted to the GTI API and associated with the corresponding GTID.

The start call, send chat, receive chat, and end call events are all associated with the same GTID and the same end user UPN such that the events can be analyzed together as part of a single transaction. This permits the system to determine a call duration (e.g., time between start and end events), the number of chat messages, as well as other information relating to the call, thereby providing useful information at the transactional rather than single event level. This also permits an analysis of a given end user's actions across multiple transactions, thereby providing useful insight into end user status and performance that can be displayed using the Adaptive Workspace System, as discussed in more detail below.

Turning again to FIG. 1, incoming event data to the GTI API is stored to the Event Queue as an individual event associated with a GTID. The event data is optionally subjected to additional processing while stored to the Event Queue, such as labeling, filtering, or masking. The data labeling analysis creates an ontology describing a shared experience between a provider and a customer. The labeling analysis associates the event data organized by transactions with label data representing various label categories, including, but not limited to, a customer interaction type identifier (e.g., sales call, technical support, etc.), a customer intent identifier (e.g., the customer's objective in contacting the provider), or a customer interaction segment identifier (e.g., call opening, issue description, issue resolution, closing, etc.). A more complete description of the labeling analysis techniques utilized to characterize a shared experience can be found in Applicant's co-pending application Ser. No. 16/908,280, the entirety of which is incorporated herein by reference.

The event data masking process scrubs the event data to remove certain information according to predetermined and customizable preferences, such as removing social security numbers, financial account numbers, or other sensitive data. The event data can also be filtered to delete particular events according to predetermined and customizable preferences.

Event data stored to the Event Queue is multiplexed to group the event data according to the event source software application before being stored to the Event Database for longer term storage or passed to a Predictive Analytics, Descriptive Analytics, or Insight Analytics Workspace ("IAWS") software application. For instance, the event data multiplexing may identify all event data generated by a given Internet browser, instant messaging application, or by a phone event source. The system stores the multiplexed event data to an Event Hub, or queue, before passing the multiplexed event data to a Rules Engine or Machine Learning process for further analysis to provide customizable insights into the current or past activities of the agent computing device(s).

The Descriptive Analytics software application utilizes models that quantify and provide insight into a provider's operation, including, for instance, information relevant to a particular provider client account, site location, or line of business. The Descriptive Analytics application provides a short-hand mechanism to gain an understanding into the overall volume, quantity, boundaries, or shape of client account activities or a line of business, which can serve as one of the initial stages for more advanced analytics.

The Predictive Analytics application utilizes a wide range of models to describe the magnitude and direction of factors that influence a business's activities and are used to forecast future outcomes. The Predictive Analytics application analyzes historical data using a wide variety of techniques, including, for example, simple linear modeling and machine learning neural network analysis to generate optimal predictive outcome. Rigorous consistency and historical back-testing establish a confidence level with the predictions so they can be relied on for decision making. As a simplified example, the Predictive Analytics may determine that an agent computing device has been engaged in a call of a prolonged duration or that the agent computing device has performed an unusually large number of Internet searches during an ongoing call, which can be an indication that the ongoing call is not going well and the agent needs assistance or additional training.

State and Presence Data

With regard to the embodiment in the attached figures, the event data is sent to a Presence API to perform a state analysis that results in end user computing device state data. The state data indicates a status of the end user computing device or event source. In the example embodiments described herein, the Presence API conducts a state analysis utilizing the event data to ascertain state data such as: (i) whether the end user computing device is or was logged into the provider system ("On System" or "Off System"); (ii) whether the end user of the end user computing device is or was engaged in a call ("On Call" or "Off Call"); (iii) whether the end user of the end user computing device is or was engaged in an instant messaging chat session with a consumer ("On Chat" or "Off Chat"); or (iv) a variety of other useful states ascertained from various event sources. A supplementary Presence API can optionally be utilized to ascertain additional information, such as the number of instant messaging chat sessions the end user computing device is or was engaged in, if any.

The system can also be configured to run a more detailed state analysis, referred to herein as a "presence analysis," to yield secondary state data, which is also referred to herein as or "presence data" or "presence state data." The presence analysis relies on data in addition to the event data, such as data from an ACD system or other third-party source. The presence analysis can also include processing historical state data and event data, analyzing event and other data over time, and processing data from sources other than event data, to determine presence state data that provides more detailed insights into the activities of an end user or end user computing device as a whole. Moreover, the presence data determined by the presence analysis can include a determination of state duration data indicating the length of time that a state or presence has persisted. Those of skill in the art will appreciate that the example state and presence analytical techniques set forth in this application are non-limiting, and other types of analytical techniques, outputs, and input data can be used to yield relevant state and presence data.

The state and presence data can both be determined by a Presence API or by an Adaptive Workspace Point of Presence software application ("AWS POP"), or the determination of state and presence data can be performed separately by the Presence API and the AWS POP software application. In the embodiment depicted in the attached figures, the Presence API determines the initial state data, also referred to as the "primary state data," based on received event data. The primary state data is then fed to the AWS POP software application to conduct a presence analysis that yields secondary state data or presence data.

The Presence API and AWS POP software application can incorporate software that performs the state or presence analysis using a State Rules Engine or Presence Rules Engine, or other processing algorithms that evaluates data from multiple sources to generate state and presence data. The State Rules Engine and Presence Rules Engine software code can be configured to provide state or presence data based on rules relating to the receipt of event data representing certain types of events (e.g., start call event, event source end event), the receipt of event data from particular event source software applications, the receipt of given combinations of event data types, the receipt of conflicting or varying event types, the receipt of specific values or types of data from an ACD system or other third-party data source, any other rules relevant to ascertaining end user or end user computing device activities. The State or Presence Rules Engines can be implemented as a matrix that maps various incoming event data, ACD data, or other data to corresponding state or presence identifiers as well as provides priority information concerning which state or presence values should be displayed to an end user. Those of skill in the art will recognize that other analytical techniques could be used to conduct the state and presence analyses, such as machine learning techniques, like neural networking, or various statistical analyses.

As an example of the state analysis, the Presence API can detect a login or logoff event transmitted by an event source software application utilized to authenticate the end user computing device to a provider system, thereby transitioning the state data to an On System or Off System state. The Presence API can also utilize event data from a proprietary application to determine whether an end user computing device has logged into a provider system, thereby entering an On System state. For instance, a provider's system can be configured so that a proprietary Internet browser application launches each time an end user computing device logs into the provider system. Receipt by the Presence API of start Internet browser event data from the browser application results in the Presence API generating state data indicating that the end user computing device is in an On System state. Likewise, receipt by the Presence API of end browser event data results in the Presence API generating state data indicating that the end user computing device is in an Off System state. Thus, the state analysis yields state data in these instances based on the type of event data received (i.e., start or end event) and the event source application (i.e., the Internet browser application).

As another example looking at the type and event source of particular event data, the Presence API similarly can determine whether an end user computing device is in an On Chat or Off Chat state resulting in the generation of corresponding state data through analysis of event data received from an instant messaging chat application. That is, receipt of start messenger event data results in the Presence API generating On Chat state data, and receipt of end messenger event data results in the Presence API generating Off Chat state data.

The presence analysis is more detailed and can additionally provide state duration data based on the time elapsed since the receipt of given event data, ACD data, or other types of data. To illustrate, the presence analysis can provide state duration data that provides the time elapsed since the receipt of a start Internet browser event data to indicate the overall amount of time the end user computing device has been in a primary state of On System. Or the presence analysis can yield state duration data indicating the time elapsed since the receipt of a start incoming call status from an ACD system. In these instances, both the state and presence analyses would yield a state of On System or On Call respectively, but the presence analysis provides additional detail into the length of time the states have persisted.

The presence analysis can be further illustrated with the following simplified examples. In one embodiment, the AWS POP software application relies on ACD data to ascertain whether an end user is in an On Call or Off Call state. Receipt by the AWS POP software application of end call status indicates an Off Call state. The Presence API separately might receive event data from an After Call Wrap-up ("ACW") software application event source indicating that the end user computing device is being used to enter data into a database concerning the recent shared experience for which a call just ended, such as recording sales made or technical issues resolved during the shared experience. The Presence API generates On ACW state data based on the event data received from the ACW event source software application.

The Presence API transmits to the AWS POP software application the On ACW state data generated from event data received from the ACW event source application. In that case, it may be advantageous for the end user computing device to remain in an On Call state or an ACW state to indicate through an Adaptive Workspace interface that the end user computing device is not yet available notwithstanding having completed a shared experience telephone call. Thus, the AWS POP software application performs a presence analysis that processes both the ACD data and the state data from the Presence API. The presence analysis can rely on a Presence Rules Engine to determine that the On ACW state should take priority, and the On ACW presence value is passed to the Workspace for display. Upon receiving state data from the Presence API indicating that the On ACW state has ended, the AWS POP software application transmits state data to the Workspace that results in the AWS interface displaying a status indicating the end user computing device as being available.

As another example, the AWS POP software application might receive state data from the Presence API indicating that an end user computing device is in an Off Call state, and the AWS POP software application might also receive state data from an Automated Call Distributor ("ACD") system that the end user computing device is in an auxiliary, or "AUX" state, indicating that the end user is on a break. The AWS POP software application evaluates the state data received from both the phone event source software application and the ACD system and determines that the AUX state should prevail for display in an AWS interface.

As another example, the AWS POP software application can include rules that analyze historical state data. For example, the AWS POP software application might determine that a phone event source application or an instant messaging event source application for an end user computing device has indicated an On Call or On Chat state for an extended duration, such as four hours. In that case, the AWS POP software application generates presence data transitioning the end user computing device to an Off Call or Off Chat status given that it is unlikely a call or chat session would persist for such a long duration.

In another example, the AWS POP software application might receive a start call status originating from an ACD system having a first GTID value and GUID indicating that an end user computing device is in an On Call state. After five minutes, the AWS POP software application receives a hold begin status also having the same GTID and GUID values from the phone event source indicating an On Hold state. And after another five minutes, the AWS POP software application receives a hold end status with the same GTID and GUID from ACD system followed by periodic receipt of "on call" statuses with the same GTID and GUID for the next five minutes.

The AWS POP software application conducts a presence analysis that recognizes the event data is correlated into a single transaction based on the GTID and GUID. The presence analysis thus yields a primary state of "InbContact" (i.e., an inbound contact, such as receiving a phone call) with a duration of five minutes but a secondary state or presence of On Call with state duration data indicating the shared experience has persisted for an overall duration of fifteen minutes. In this manner, a supervisor or other end user can ascertain deeper insights into the overall course of a shared experience. And importantly, the Adaptive Workspace System can more accurately trigger alerts, such as an alert indicating that an agent requires assistance when the overall duration of a shared experience has persisted too long, as determined from the presence data.

Adaptive Workspace System Intelligent Monitor Interface

Figure 4:
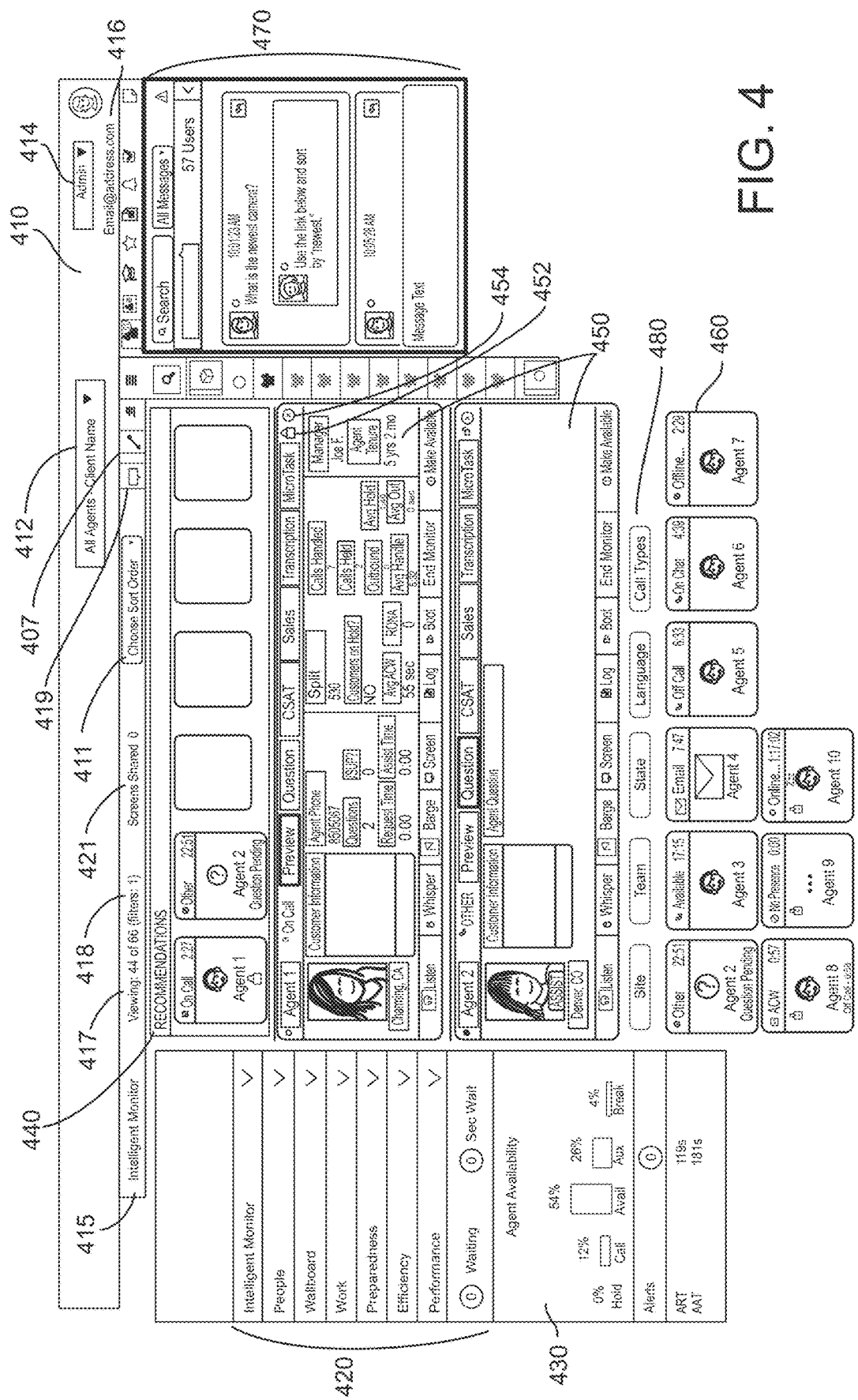
FIG. 4 illustrates an example intelligent monitor graphical user interface.

The Adaptive Workspace System provides integrated AWS interfaces that coherently and seamlessly display substantial volumes of data from disparate systems in a manner that enables the real-time monitoring of, and collaboration between, end user computing devices and that permits further analyses of event data that informs future decisions and actions to facilitate and improve shared experiences. An example AWS GUI intelligent monitor interface is shown in FIG. 4. The AWS GUI intelligent monitor interface provides a home screen or dashboard for real-time monitoring and collaboration and is generated using the enriched, correlated event data, presence data, and state data, among other sources. The various AWS GUIs are created using a User Experience Design Methodology ("UX") that focuses on the needs of end users while still achieving desired provider objectives.

Turning again to FIG. 4, the exemplary intelligent monitor interface illustrates the use and display of data in the context of a call center environment. The intelligent monitor interface is configured for use by a supervisor computing device in monitoring and managing various agent computing devices, and the intelligent monitor interface includes: (i) a header section 410; (ii) a side bar menu tree 420; (iii) a main status section 430; (iv) a recommendation panel 440; (v) an agent blackboard 450; (vi) an end user tiles section 460; and (vii) an instant messaging application interface 470. End user computing devices are depicted using square icons and are referred to as "tiles," "end user tiles," or "agent tiles."

The header section 410 of the intelligent monitor display can display information that includes a breadcrumb trail 415 that dynamically changes to indicate a title for the current interface or a title for the menu options selected to display the current content of the intelligent monitor interface. The header section 410 also includes a UPN 416 or profile picture for the current end user. The header section 410 further includes a tile display pull down menu 412 that allows an end user to select certain tiles for display based on user status element data provided by the User Status API, such as displaying tiles for all agents assigned to a particular site or client or displaying a subset of such agents over which the end user has supervisory authority. The header section 410 can additionally incorporate a drop down menu that allows an end user to change roles 414 depending on the permissions data received from the ADA API, such as transitioning from a supervisory role over one site or client to a supervisory role over a second site or client. In this manner, an end user could seamlessly manage multiple sets of agents or transition from managing one set to another.

Figure 5:
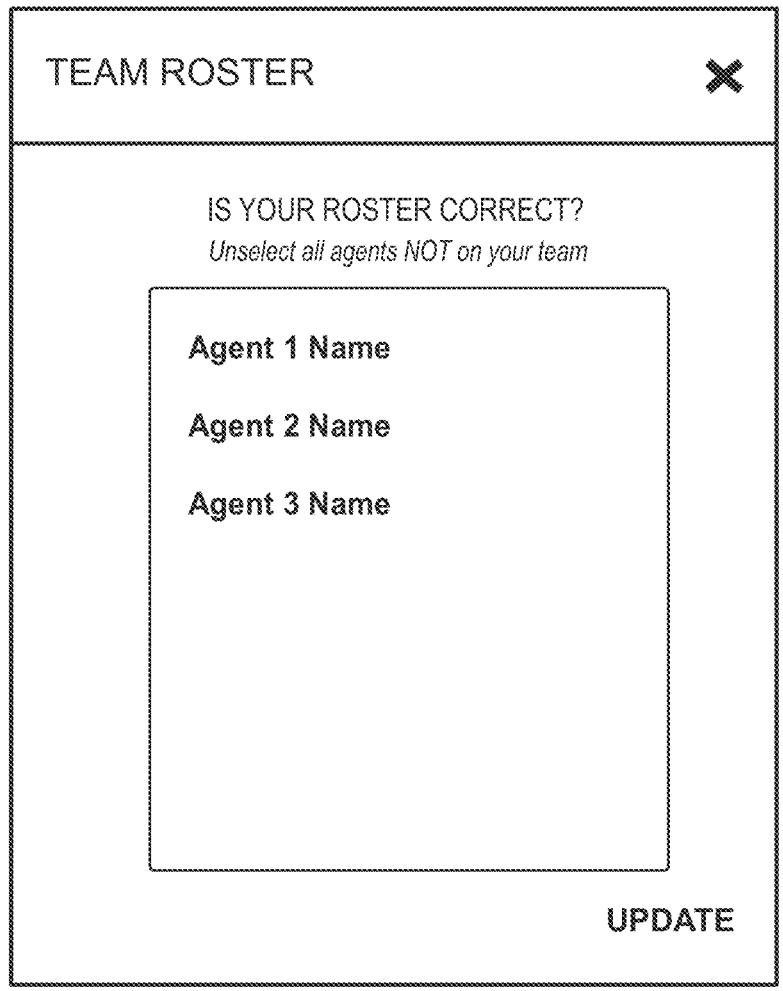
FIG. 5 illustrates an example Team Roster graphical user interface.

A supervisor computing device can further refine the tiles displayed by, for instance, selecting the UPN function 416 to open the example Team Roster interface depicted in FIG. 5. The Team Roster interface displays the current agents (and corresponding tiles) assigned to the supervisor in a given role. The Team Roster interface permits a supervisor computing device to select and deselect agent tiles for display on the intelligent monitor display as well as to reassign agents not properly assigned to a supervisor.

On returning to the intelligent monitor interface, the Viewing status function 417 indicates the number of tiles currently displayed relative to the number of tiles that are available for display. The displayed tiles can be sorted according to a variety of categories, including, for instance, sorting by last name, tenure, or any other relevant category, by selecting the Choose Sort Order pull down menu 411 shown in the header section 410 of FIG. 4.

The header section 410 incorporates additional functions that permit customization of the information displayed in the intelligent monitor interface, including the filters function 418 that shows the number of filters currently applied to the information displayed in the intelligent monitor interface. In some cases, it may be advantageous for a supervisor or agent computing device to share the device display screen with another supervisor or agent computing device to conduct a meeting or when, for instance, visual demonstration of a particular function would be beneficial. The screen sharing function may be initiated through selection of the screen sharing function 419 in the header section 410. The Screens Shared function 421 shows the number of supervisor computing devices sharing a display screen with one or more other end user devices.

Selecting the filters function 418 opens the example filters interface shown in FIG. 6. The filters interface permits the end user to apply various criteria to the display of tiles in the intelligent monitor interface based on user status element data, presence data from the AWS POP, or other relevant data sources. The example filters interface depicted in FIG. 6 provides options for filtering the display of tiles according to: (i) specific end user names; (ii) end user assigned to particular provider sites or locations; (iii) end user assigned to particular supervisors; (iv) end user computing devices having a status determined by the AWS POP as having a state of On System or Off System; (v) computing devices determined by a DNS Buoy check to be running Onsite or Offsite; or (vi) any other useful filtering criteria.

Figures 7, 8:
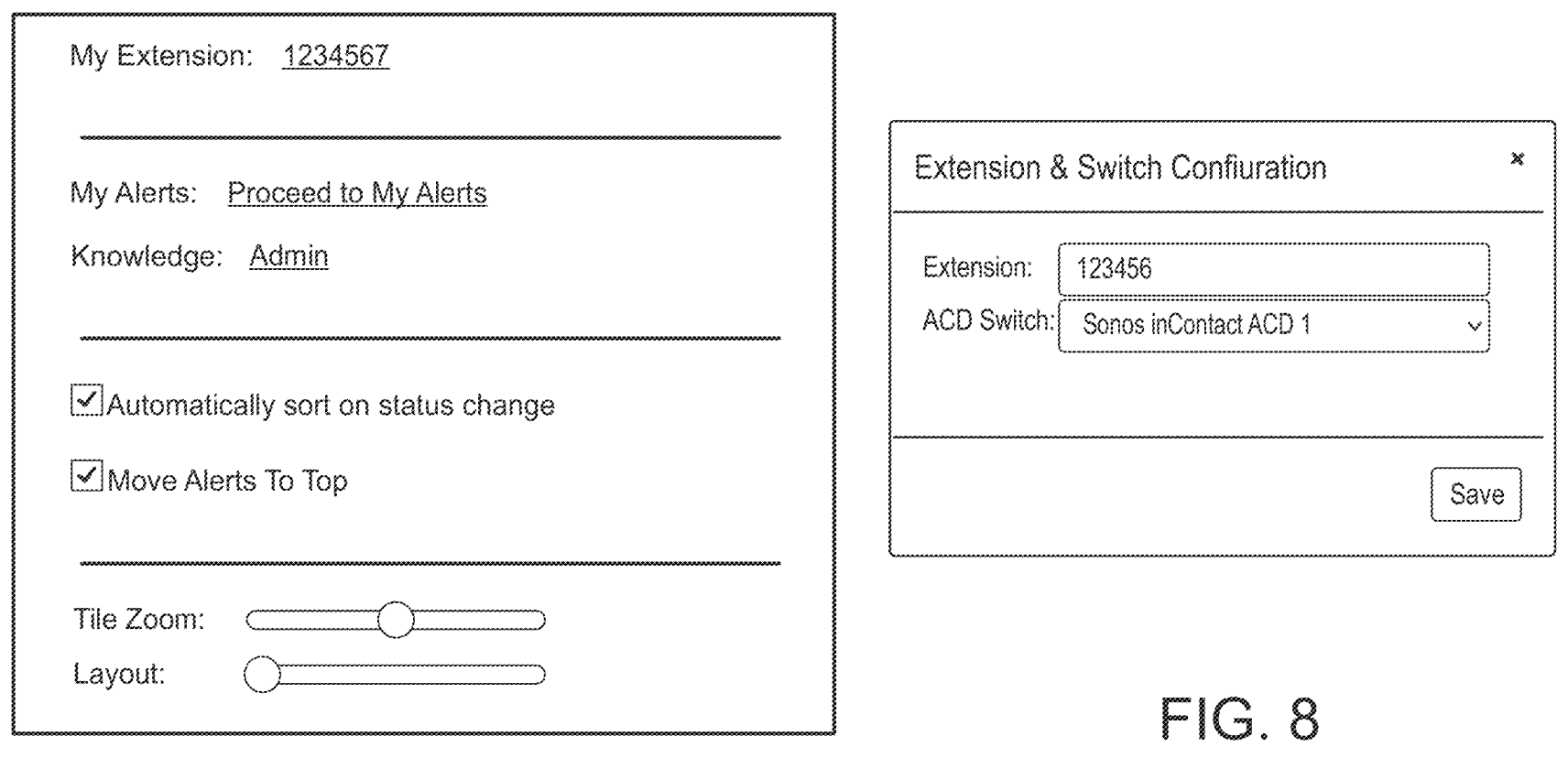

Selecting the Options function 407 on FIG. 4 opens the Options interface shown in FIG. 7 that displays a variety of information and settings configurable by selecting functions available on the interface. The configurable settings include the end user's current telephone extension, which can be set by selecting My Extensions function to open the Extension & Switch Configuration interface of FIG. 8.

The Extension and Switch Configuration interface permits an end user to manually enter a telephone extension while also selecting from available Automatic Call Distributor ("ACD") switch identifiers. The end user telephone extension and ACD switch identifier are necessary to enable the Adaptive Workspace System to perform certain functions available on the AWS GUI, including, for example, the Listen or Whisper functions. In some embodiments, the telephone extension and ACD switch identifier are determined upon end user authentication or login to the system and passed to the Adaptive Workspace System. In other cases, where the telephone extension and ACD switch identifier are not automatically detected, the information is manually entered using the Switch Configuration interface.

Figures 16, 17:
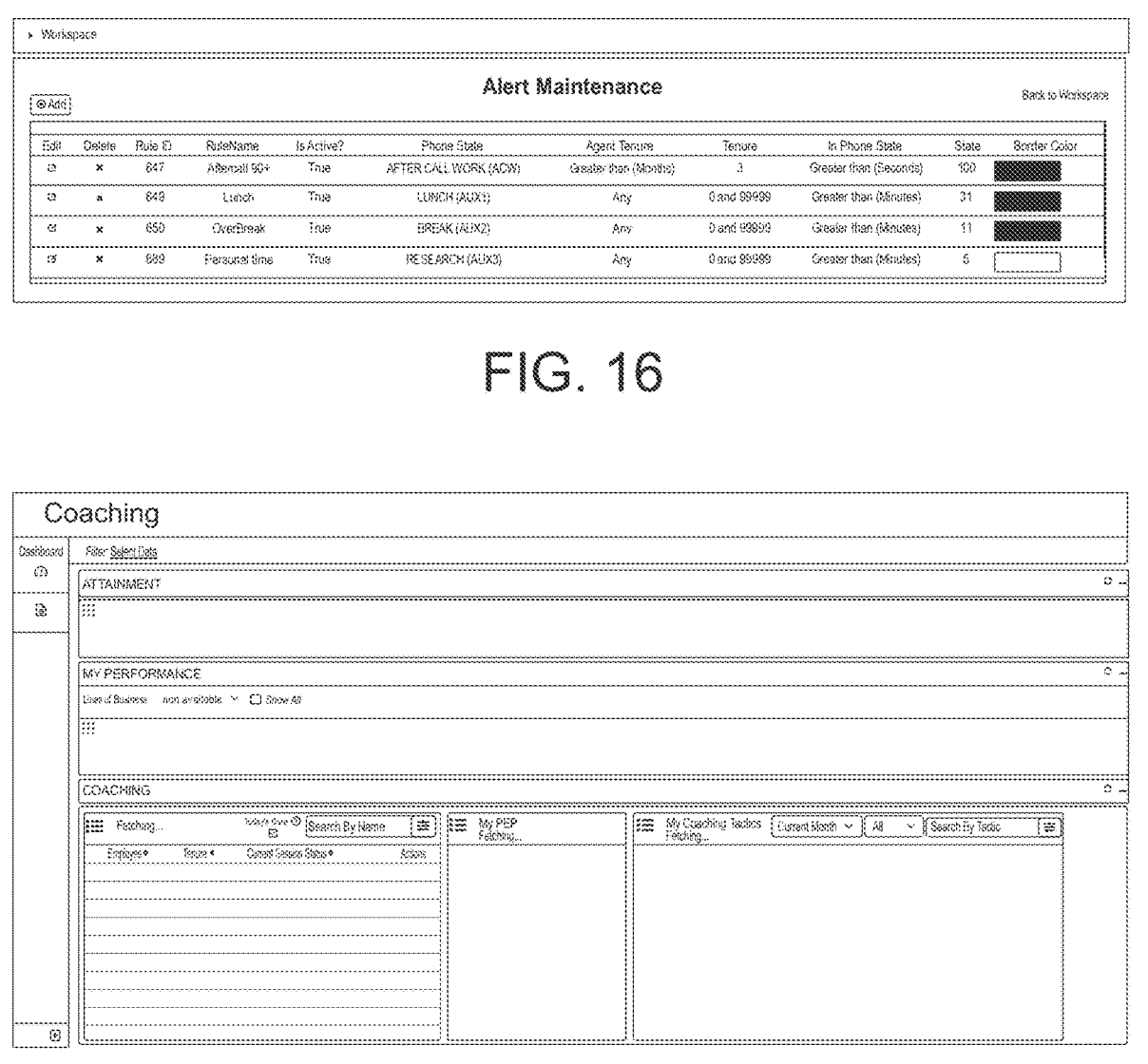

Turning again to the Options interface of FIG. 7, selection of the My Alerts function opens an Alert Maintenance interface, such as the example My Alerts interface shown in FIG. 16. The My Alerts interface allows end users to create customized alerts for display on the intelligent monitor interface. Alert data can be displayed in a variety of formats to enhance end user awareness including, for example, changing the internal color of the tiles, changing an icon displayed within the tile, change the textual display of an alert, outlining the tiles with a border of a particular color, or generating a popup display containing alert text.

Different types of alerts can be established at different system levels and according to end user permission levels. For instance, alerts can be: (i) established on a system-wide basis; (ii) configured according to client preferences so that the intelligent monitor interface meets client requirements and preferences; (iii) configured to be consistent across a given provider site, program, or line of business; or (iv) customized according to individual end user preferences. Each system level of alerts can provide different permissions to control what conditions trigger an alert and how the alert is displayed. In this manner, the Adaptive Workspace System ensures that alerts can be created to meet client requirements while also preventing individual end user computing devices from editing alerts that are considered to be critical or required for proper system operation and customer service.

To illustrate, in one embodiment, a Workspace Administrator Tool software application can be used to establish alerts on a system-wide or client basis that cannot be edited by individual end user computing devices. Alerts established at the system or client level can control the display of the interior tile color, the icon displayed within a tile, the textual labels of alerts, and the functions implemented when an alert is selected by an end user computing device. The system or client alerts are not configurable by individual end user computing devices, and end user computing devices are required to take particular actions in response to such alerts.

On the other hand, within the same embodiment, the My Alerts interface shown in FIG. 16 allows individual end users to create and edit customized alerts that are triggered and displayed only within the intelligent monitor interface of the particular end user. The example My Alerts interface shown in FIG. 16 allows a particular end user computing device to create alerts that are triggered according to the current state or presence of other end user computing devices (e.g., On Call, Off Call, On Chat, etc.), the duration such state or presence has persisted, and the tenure of the corresponding end users (e.g., agents with more or less than one year of work experience in a given line of business, etc.). The My Alerts interface of FIG. 16 also allows end users to control the display of alerts only according to the color of a border surrounding the end user tiles, so that individual end users are not permitted to change the interior color of the tile, the icon within a tile, the text of an alert, or the functions implemented when an alert is selected. For end users such as supervisors that have permissions to work across different sites, clients, or lines of business, the customizable alerts created through the My Alerts interface can seamlessly follow the end user if the end user switches roles using the role pull down menu 414 shown in FIG. 4.

As an example, of alerts customizable by individual end user computing devices, an alert can be created that transitions a tile border color from green to yellow if an On Call status persists for longer than ten minutes or from yellow to red if the On Call status persists for longer than fifteen minutes, which indicates that a shared experience has persisted for too long. Continuing with this example, separate alerts can be created according to agent tenure where, for instance, the tile border color transitions from green to yellow after only five minutes for agents with more than three years of experience who are expected to be more efficient with shorter Average Handle Times. Those of skill in the art will appreciate that the above examples are not intended to be limiting, and alerts can be established according to a wide variety of trigger conditions based on the state data, presence data, state duration data, ACD data, end user attribute data, or other relevant factors.

The Options interface also permits end users to configure settings impacting the intelligent monitor interface display, such as automatically sorting tiles upon a status change received from the AWS POP (e.g., On Call, Off Call, Available, Email, etc.), prioritizing the display of alerts, changing the tile size, and changing the size of the tiles section 460. Selecting the Knowledge function on the Options interface of FIG. 7 opens a Knowledge Center interface. The Knowledge Center interface provides end user computing devices with access to a knowledge environment providing a wide variety of reference information useful for facilitating a shared experience, such as product manuals or trouble shooting flow charts.

As a result of the Adaptive Workspace System receiving event data asynchronously and synchronously in real time, the AWS GUI can display up-to-date data concerning end user attributes, performance, and state information. The tiles, as show in FIGS. 4 and 9A & B, display information relevant to the state and attributes of the end users and end user computing devices, as determined by an analysis of the state data by the Presence API or AWS POP software application. A tile header in FIG. 9A shows a primary state 902 of the end user computing device of "InbContact" and the current primary state duration data 904 indicating the primary state has persisted for 20 minutes 53 seconds. The tile of FIG. 9A also depicts a secondary state 906 of On Call and provides secondary state duration data indicating the secondary state has persisted for 20 minutes 51 seconds. Selecting the tile header changes the appearance of the tile from the embodiment shown in FIG. 9A to the tile appearance shown in FIG. 9B that highlights the primary state data and primary state duration data.

Other potential states include, but are not limited to: (i) InbContact (i.e., an On Call state as indicated by an ACD system); (ii) Available for a shared experience or task assignment; (iii) Unavailable; (iv) On Call with a customer; (v) Off Call; (vi) On ACW indicating the agent computing device is utilizing the After Call Wrap-up software application following the end of a shared experience call; (vii) Meeting with other provider personnel; (viii) On Hold indicating the agent has placed a customer on hold during a shared experience; (ix) On Chat indicating the agent is utilizing an instant messaging application to communicate with a customer or other provider personnel; (x) Off Chat; (xi) Email indicating that the agent computing device is engaged in drafting an email; (xii) Break indicating the agent is on shift but has taken a break; (xiii) On System; (xiv) Off System; or (xv) any other relevant state or status.

In addition to presence and state data, the tiles also display the end user name as well as an activity icon that provides readily viewable data concerning the end user's current activities or attributes. For instance, the headset icon in FIG. 9A indicates the end user computing device is engaged in a telephone call as part of a shared experience, and a remote end user indicator 908 shown as a dashed square surrounding the icon indicates that the end user computing device is connected to a provider network remotely using VDI or VPN. Additional examples include display icons such as: (i)

a question mark indicating the agent has utilized the instant messaging application to pose a support request to be answered by a supervisor; (ii) an envelope icon indicating the agent is preparing an email; (iii) a coffee mug icon indicating the agent is on break; or (iv) any other icon or graphical depiction useful for providing readily recognizable state information.

Figures 10A, 10B:
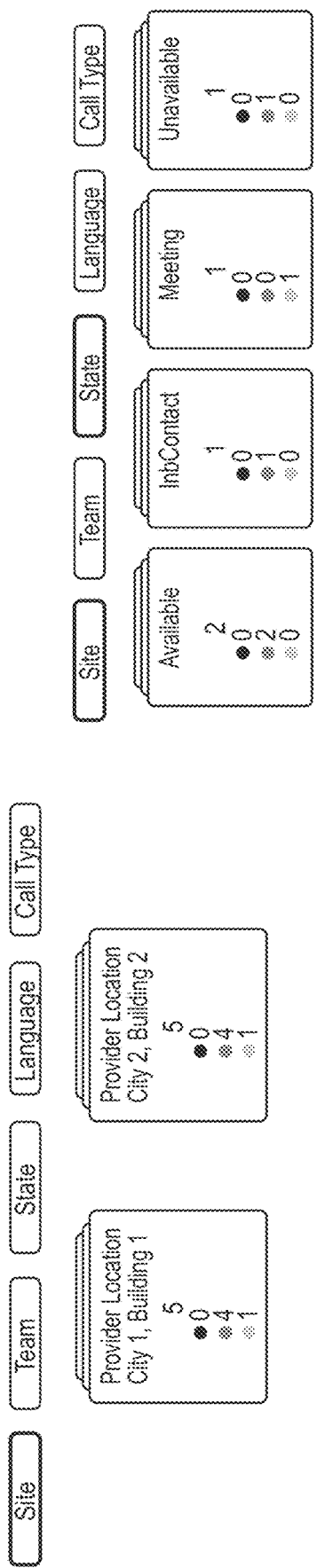
FIG. 10A illustrates an example Summary Tab.
FIG. 10B illustrates an example Summary Tab.

The intelligent monitor interface can be streamlined using the Summary Tabs 480 function shown in FIG. 4 to condense the display of tiles according to defined categories, as illustrated in FIGS. 10A and 10B. The example Summary Tabs 480 in the attached figures include example categories for: (i) a provider site location, such as a brick and mortar office in a particular city; (ii) Team, which can include a supervisor name, client name, line of business, or other category denoting a group of end users, and the number of agents assigned to the category; (iii) state or presence as determined by the AWS POP software application; (iv) Language spoken by the agent; and (v) Call Types, such as sales calls or technical support. The condensed tile displays, such as those shown in FIGS. 10A and 10B include indicators providing the number of agent computing devices within the category, indicators providing the number of available or unavailable agent computing devices, indicators providing the number of agent computing devices in an alert state, or other useful indicators of state, end user attributes, or other information.

The intelligent monitor interface of FIG. 4 further includes a recommendation panel 440 for the display of tiles corresponding to end user computing devices to be monitored or for which action is required. For instance, end user tiles can be placed on the recommendation panel 440 when the end user has submitted a request for assistance that was routed to the supervisor viewing the display or when a tile has generated an alert. Thus, conditions requiring end user action can be expediently brought to the end user's attention. The tiles can be "locked" to the recommendations panel 440 by selection of the lock function 452 of the agent blackboard 450 so that the tile is not supplanted by tiles correlated to a newly generated support request or alert. Similarly, tiles can be removed from the recommendations panel 440 and the agent blackboard 450 closed by selecting the remove function 454. Additional details concerning the monitored end users and end user computing devices are displayed in the agent blackboard 450, which includes a multitude of functions that permit the display of various types of data concerning end users and end user computing device attributes and performance.

Selection of the Preview function on the agent blackboard 450 enables the display of call statistics determined from the event data, ACD data, presence or state information, and background and employment information relating to the end user that can be determined from the user status elements of the enriched event data. The Preview function of the agent blackboard 450 displays end user data that includes, but is not limited to: (i) the end user's name; (ii) a profile picture for the end user; (iii) the identity of the end user's manager; (iv) the end user's site or geographic location; (v) the end user's role; (vi) the length of the end user's experience or tenure working for the provider; (vii) the end user's telephone number; or (viii) any other information useful for monitoring and managing the performance of the end users. The exemplary embodiment of FIG. 4, for example, shows that Agent 1 is located in Charming California, has a supervisor named "Joe F.," and has a tenure experience of five years and three months.

The event data also enables the Preview function of the blackboard 450 to display information relating to end user performance data metrics during a given work shift, including, but not limited to: (i) the number of questions asked during a shift using an instant messaging chat application; (ii) the number of customer requests to interact with an end user's supervisor (designated "/SUP?"); (iii) the total amount of time an end user has been waiting to receive assistance during a shared experience ("Request Time"); (iv) the duration of time an end user has currently spent being assisted during a shared experience ("Assist Time"); (v) a Split, which can be a numerical designation indicating the particular skills acquired or proficiency level of an end user (e.g., the end user specializes in technical support or sales for a given client or product); (vi) the average duration an end user has spent on after call wrap up activities ("Avg. ACW"), as measured, for instance, by the time between the receipt of an end call event from a phone event source or CTI software application event source and the receipt of an end event from an ACW software application); (vii) the number of support requests or calls redirected following a no answer by the end user computing device or CTI application (designated as "RONA"—Redirect On No Answer and indicated by a no answer event received from a phone event source or CTI software application); (viii) the number of calls answered by an end user during a shift (as measured, for instance, by the number of start call events received by the GTI API from the phone event source); (ix) the number of outbound calls made by an end user during a shift (i.e., outbound call events received); (x) an indicator of whether an end user has placed any customers on hold during a shared experience (i.e., whether any call hold events were received from a phone or CTI software application event source); (xi) the number of calls placed on hold (i.e., the number of hold call events received); (xii) the average amount of time an end user placed a call on hold (as measured by the time between hold events received from the phone event source for a given shared experience); (xiii) the average handle time ("AHT") for a shared experience (as measured, for example, from the time between receipt of a start call event and end call event from a phone event source or CTI application); and (xiv) any other information useful for monitoring and managing the performance of the end user and end user computing devices.

The example embodiment shown in FIG. 4, for instance, shows that Agent 1 has handled seven calls during the current shift and placed a call on hold twice with an average hold time of one minute and forty seconds. This information can be analyzed on an individual end user basis or as aggregated data across all end user to provide useful insights and to guide future decisions, such as whether an individual end user requires more training or whether call volumes as a whole warrant more or less end user scheduled to be available for a given shift for a given client, location, or provider line of business.

Selection of the Questions tab on the agent blackboard 450 can display a written record of questions transmitted by an end user computing device through an instant messaging software application during a given shift as part of a support request. Selection of the CSAT function display data relating customer satisfaction for the shared experiences handled by an end user. The CSAT data can consider inputs such as: (i) customer survey responses submitted following a shared experience; (ii) data entered by an end user during after-call wrap, such as whether the customer's objective was achieved; (iii) sentiment analysis of a written transcript of a shared experience utilizing natural language processing or other techniques; or (iv) any other useful indicators of customer satisfaction known to those of skill in the art.

The Sales function of the agent blackboard 450 is utilized to review data concerning the volume of sales achieved during a given shift. The sales volume data can be gathered from a variety of suitable data sources, including, but not limited to: (i) information reported by an end user computing device using an ACW software application following a shared experience that resulted in a sale; (ii) data accessed from a provider sales database; or (iii) event data received from an event source software application used by an end user computing device to complete a sale. The Transcription function is used to display within the agent blackboard 450 written transcript data of spoken or written communications between provider personnel and a customer during a shared experience. And the MicroTask function displays data relating to the number and type of MicroTasks assigned to and completed by an end user during a given shift.

The asynchronous, real-time receipt of event data and presence data from the AWS POP also permits the intelligent monitor interface to display real-time alert and status information. The example embodiment of FIG. 4 shows that: (i) Agent 1 is currently in an On Call state that has lasted for two minutes and twenty-seven seconds; (ii) Agent 2 has a pending question and is currently in an On Call state that has lasted for over twenty minutes, and as a result, requires assistance; (iii) Agent 3 is available; (iv) Agent 4 is in an Email state; (v) Agent 5 is in an Off Call state; (vi) Agent 6 is in an On Chat state; and (vii) Agent 7 is currently offline in an Off System state.

The agent dashboard 450 can include a multitude of functions useful for not only monitoring but also actively managing or assisting end users, including, but not limited to: (i) a Listen function that enables a supervisor to listen to an ongoing shared experience between an agent or other end user and a customer; (ii) a Whisper function that enables a supervisor to speak to an end user during an ongoing shared experience in a manner that cannot also be heard by a customer; (iii) a Barge function that allows a supervisor to participate in or take control of an ongoing shared experience; (iv) a Screen function that opens a separate interface such that the supervisor computing device can display the end user's computing device display (i.e., view the end user's "desktop"); (v) a Log function that displays a record of the end user's current activities as determined from the event data; (vi) a Boot function that terminates an agent from participation in an ongoing shared experience; (vii) an End Monitoring function that terminates a session previously initiated using the Listen function; and (viii) a Make Available function that places an end user computing device into an Available state notwithstanding prior state data received from the Presence API. Those of skill in the art will appreciate that the above examples of functions are non-limiting, and other types of functions can be implemented that facilitate active management of shared experiences.

The main status section 430 of the AWS GUI can be configured to display summaries of data relating to end user and end user computing device attributes, performance, and states. The example main status section 430 shown in FIG. 4 displays data relating to the end user states and availability, including: (i) the number of end users waiting for assistance; (ii) the longest wait time among the end users waiting for assistance; (iii) a graphical depiction of end user computing device states (e.g., On Hold, On Call, Available, etc.); (iv) the number of active alerts; (v) the average response time ("ART") between when an end user requests and receives supervisor assistance; and (vi) an average assistance time ("AAT") that a supervisor spends assisting each end user. The side bar menu tree 420 provides access to AWS GUIs that display a visual summary of a wide variety of data relating to end user performance and activities for both agents and supervisors, as discussed in more detail below.

Turning again to FIG. 4, the instant messaging interface 470 allows end users to enter and transmit text messages, images, or other content to other end users, including private messages between selected end users or public "posts" transmitted to a larger subset of end users (e.g., all agents on shift or On System for a given site, program, or line of business). The instant messaging interface 470 can be implemented by a distinct software application embedded within the intelligent monitor interface. The instant messaging interface can accept commands, such as "slash" commands "/?" that are support requests transmitted to specified supervisor computing devices according to a Recommendation Matrix.

Data Flow into Adaptive Workspace

Figure 11:
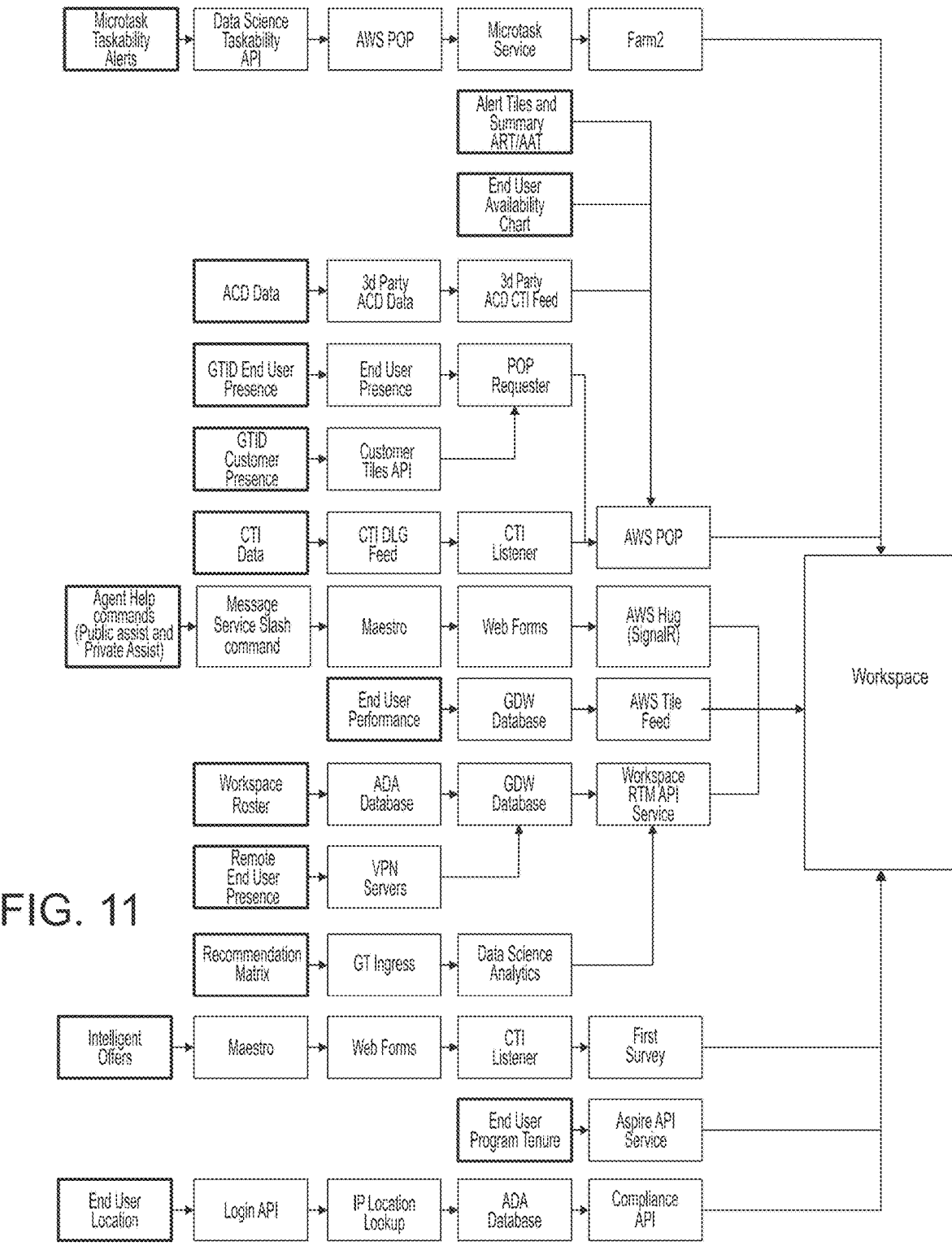
FIG. 11 illustrates data inflow to an Adaptive Workspace.

FIG. 11 provides a graphically summary of data flow into the Adaptive Workspace System through various software processes and hardware systems. The boxes in bold outlined in FIG. 11 represent various categories of data flowing into the Adaptive Workspace System. Starting with the MicroTaskability Alerts data category in the upper left portion of the figure, the MicroTaskability Alerts data is generated in part by a Data Science Taskability API software application ("Taskability API"). The Data Science APIs in general provide analytical software services based on machine learning or various statistical techniques. The Data Science Taskability API conducts an analysis to predict expected shared experience volumes, which in turn is used to determine whether end user computing devices (typically agent devices) are available to perform MicroTasks. This permits MicroTask assignments to be delivered to end user computing devices in a manner that maximizes the productivity of the agent while not engaged in a customer experience.

The MicroTasks are discrete duties or tasks transmitted to end users that are outside of the ordinary scope of customer service workflow. The MicroTasks are designed as activities that require a limited time to complete, such between one to five minutes, as opposed to ongoing duties or projects of extended duration. The MicroTasks can be implemented as a set of software instructions and knowledge items (e.g., electronic documents, webpages, images, etc.) for implementation and display by an end user computing device. Examples of MicroTasks can include training modules that simulate shared experiences and/or that present a series of questions for an end user to answer or software code that redirects an end user's computing device to a given website for completion of a training or labeling task. As another example, the MicroTasks can be formatted as discrete segments of a shared experience (e.g., a five minute sample) that are to be labeled for further analysis by the provider.

End user capacity to assist is determined in part by the Taskability API, which incorporates software code that conducts a shared experience volume analysis that considers historical volumes of shared experiences for a given time period to make predictions about expected shared experience volumes for a proceeding time period. For instance, the Taskability API may receive input data consisting of volumes of shared experiences for the same month, day, and time of day for the prior two years (i.e., June 1 from 1 p.m. to 1:30 p.m. for the last two years) to predict the expected shared experience volumes for the same month, day, and time of day in the current year. The Taskability API can further receive and process shared experience volume data according to the language of shared experiences relative to the language abilities of end users—i.e., the number of support requests for Spanish-speaking customers relative to the number of Spanish-speaking agents on duty for a given time period.

Further, the Taskability API utilizes information concerning shared experience volumes according to a particular client, site, program, or line of business for a given time period in predicting expected shared experience volumes. The predicted volume data is analyzed along with the number of end users that are on shift in determining whether enough end users are on duty to field the expected shared experience volumes. In addition to language, the Taskability API also consider other end user attributes relevant to the end user's ability to assist, such as whether the end users have sufficient experience with the client, product, program, or line of business to complete labeling assignments for that particular product, program, or line of business.

The Taskability API generates availability data based on the results of the volume analysis and an analysis of the end user attributes. The availability data is passed to the AWS POP software application that also receives state data from the Presence API, event data, ACD data or other types of data relevant to ascertaining an end user's availability for MicroTasks. The AWS POP software application conducts a presence analysis to generate presence MicroTask availability data that the AWS POP software application utilizes to determine end user status, and in particular, whether the end user computing device is available to receive a MicroTask.

The function of the Taskability API can be illustrated with the following simplified example. The Taskability API might determine based on a shared experience volume analysis that 20 agents with a particular language capability and product experience will be needed to participate in shared experiences during the next 15 minutes as compared to 30 agents that are currently on shift with the requisite language and experience abilities. The Taskability API passes to the AWS POP software application the availability data that includes the number of agent computing devices needed to meet expected shared experience volumes and identifiers for agent computing devices meeting the eligibility criteria relating to language and product experience.

In addition to the availability data, the AWS POP software application captures state data, event data, and other types of data relating to the agent computing device activities or status. For instance, continuing with the foregoing example, the AWS POP software application may receive state data from the Presence API indicating that: (i) 15 of the potentially available agent computing devices have a state of On Call or On Chat, indicating the agent computing devices are not currently available to receive MicroTasks because they are engaged in ongoing shared experiences; and (ii) 15 of the potentially available agent computing devices have a state of Off Call, indicating potential availability to receive a MicroTask. Given the number of available agent computing devices not participating in shared experiences, and the predicted shared experience volumes, the Taskability API might then return a list of 10 of the 15 agent computing devices with a state of Off Call as being eligible to receive a MicroTask.

Next, before marking an end user computing device as available for a MicroTask, the AWS POP software application performs the presence analysis evaluating state data received from the Presence API, event data, ACD data, or other data to determine whether an end user computing device is engaged in activity that would preclude completion of a MicroTask notwithstanding the state of the end user computing device. For instance, the Presence API may determine the end user computing device is in an Off Call state, but the event data received by the AWS POP software application might also indicate the Off Call state has persisted for several hours (state duration data) indicating that the end user is no longer on duty but the agent computing device was instead left logged into the provider system. Thus, in that case, the AWS POP software application presence analysis Presence Rules Engine can include a rule that marks the end user computing device as not being eligible for a MicroTask even though the state data indicates the end user has an Off Call state and is not presently engaged in a shared experience.

The result is that the AWS POP software application outputs presence MicroTask availability data, which can be a list of identifiers for end user computing devices eligible for a MicroTask that is passed to the MicroTask Service software application. The MicroTask Service software application provides data concerning the supervisor computing device identifiers associated with the eligible agent computing devices. This data is utilized by the Adaptive Workspace System to display alerts or notifications to the appropriate supervisor computing devices that an agent on the supervisor's team is eligible for a MicroTask. The MicroTask Service passes the eligibility data and supervisor identifier data to the Farm 2 system for transmission to the Workspace, as shown in FIG. 11. The Farm 2 system is implemented as one or more network servers that route incoming data and requests to the Adaptive Workspace. The Farm 2 system provides load balancing and scalability in handling varied volumes of incoming data to the Workspace.

The Adaptive Workspace System generates one or more alerts that are transmitted to the supervisor computing device(s) for display on the AWS GUIs, such as the intelligent monitor interface. The AWS GUIs further include a MicroTask Assign function that, when selected by the supervisor computing device, initiates transmission of the MicroTask to the agent computing device. In this manner, supervisors are provided with current information concerning MicroTask eligibility, assignments and the ability to manage or approve such assignments. Following assignment of a MicroTask, the Adaptive Workspace System can update the status of the end user tile to indicate the associated computing device is presently engaged in a MicroTask.

The Alert Tiles and Summary (ART/AAT) data category represents data derived in part from the instant messaging software application event data concerning: (i) the average amount of time each end user computing device waited to receive assistance following entry of a support request command ("/?") into the messaging application interface, such as the interface 470 shown in FIGS. 4 and 14; and (ii) the average amount of time each agent computing device spent receiving assistance through the instant messaging interface. The durations are determined by measuring the time between the receipt of event data representing a start support request event, a response to a support request event, message send and receive events, and message session termination events, as well as other relevant event data. The ART and AAT data is sent to the AWS POP software application for use in the presence analysis before being transmitted to the Workspace for display on the AWS GUI, such as on the agent blackboard 450 shown in FIG. 4.

The AWS GUIs can also be configured to display a wide variety of alerts to facilitate end user monitoring. As part of generating the alerts, an Alert Monitor software process receives presence data from the AWS POP software application as well as state data, end user attribute data, ACD data, or other relevant types of data. The Alert Monitor software process includes Alert Rules Engine software code that processes the presence data, or other types of data, to recognize one or more trigger conditions. The Alert Monitor software processes the presence data to generate alert data in response to the Alert Rules Engine software code recognizing a trigger condition associated with an end user computing device. As one example, the Alerts Rules Engine software code can be configured to recognize when the presence data indicates an end user has been engaged in a shared experience for a prolonged period indicating that the end user might require assistance. The Alert Rules Engine software code can also be configured to vary the trigger conditions according to end user skill or tenure. For instance, the Alert Rules Engine software code can be configured to set a threshold of five minutes for experienced end users to complete a shared experience and a threshold of ten minutes for new end users The Workspace software code receives the alert data, and as part of generating the adaptive workspace GUI, the Workspace software code generates an Alert Indicator responsive to the alert data and incorporates the Alert Indicator into the AWS GUI. The Workspace software code can incorporate the Alert Indicator into the adaptive workspace GUI by a variety of display techniques, including, for example: (i) changing the color of the display tile for the end user computing device (e.g., from green to red to indicate an alert); (ii) changing the position of the display tile for the end user computing device (e.g., promoting the tile to the recommendation panel 440); or (iii) incorporating an alert icon within the display tile for the end user computing device.

The End User Availability Chart data category in FIG. 11 represents presence data determined by the AWS POP software application as discussed in more detail above. The AWS POP software application transmits the presence data to the Workspace software for display on the main status section 430 of the intelligent monitor interface representing the percentage of end user computing devices having various presence or state data status, such as On Hold, On Call, Available, Aux, or On Break.

The third party ACD data category shown in FIG. 11 represents data received from an Automated Call Distributor system relating to the receipt of incoming calls from customers and the routing of calls to appropriate agents or other end users. The ACD system might be hosted by a third party or implemented internally to the provider system. The ACD provides a wide variety of ACD data concerning incoming calls, including, but not limited to: (i) routing information for virtual or physical phone event sources; (ii) skill or proficiency data for agents (i.e., technical support, sales, account management, etc.) that can be used in call routing; (iii) data entered by a consumer to an Interactive Voice Response ("IVR") interface (e.g., data spoken or keyed into a phone by a consumer in response to questions); (iv) the volume of incoming calls; (v) the time the call was received; (vi) the duration of each call; and (vii) the telephone number for each incoming call (i.e., caller ID data).

The ACD data from the ACD system is passed to 3d Party ACD CTI Feed API. The third party ACD system in some cases may not be configured to interface directly with the provider systems. The CTI Feed API and the CTI Listener API (also shown in FIG. 11) can provide an interface that bridges the gap and translates incoming third party ACD data into a format that can be processed by the provider system, including the AWS POP software application that determines presence data for the end user computing devices based in part on the incoming ACD data. After conducting a presence analysis, the AWS POP software application transmits the presence data and ACD data to the Workspace for display on the intelligent monitor interface recommendations panel 440, agent blackboard 450, and/or tiles section 460.

To illustrate the interface functionality provided by the CTI Feed API and the CTI Listener API (collectively "CTI APIs"), the CTI APIs in some embodiments can implement communication protocols required by the ACD system, such as registering with the ACD system through the exchange and validation of certificates or tokens, establishing a secure connection protocol such as VPN tunnel, or handle encryption protocols. Different ACD systems may also provide ACD data at varying intervals, such as every one second or every 15 seconds, or the ACD system may not provide ACD data at all without receiving a query. The CTI APIs can be configured to send queries at required intervals or handle varying periodic ACD data inflows. The ACD system may also transmit ACD data with varying information or formats, such as omitting a time stamp that is then appended to the ACD data by the CTI API for use by the provider system, including the AWS POP software application.

Note that in some embodiments, providing an API to interface between the ACD system and the provider systems, including the AWS POP software application, is not possible or practical. In those instances, the STDA can be configured to capture end user utilization of a Computer Telephony Interface software application as event data from the end user computing devices. The STDA can, for instance, capture end user selection of an answer button as a start incoming call event or selection of a hold button as a hold event. This technique has the advantages of permitting interface to the GTI API of the provider Foundational Analytics system so that the incoming call data can be enriched, organized into transactions, and correlated to the correct end user UPNs, among other functions. In other embodiments, the ACD system could be configured to interface directly with the GTI API of the provider Foundational Analytics system so that the incoming call data can be enriched and organized into transactions as part of the standard Foundational Analytics work flow.

The GTID End User Presence data category shown in FIG. 11 entails the capture of end user presence data from the Presence API, event data from the Foundational Analytics system, and other types of available data (e.g., data from the ACD system) relevant to determining end user presence data by the AWS POP software application, as discussed in detail above. The state, event, and other data is submitted to the POP Requester software service prior to being passed to the AWS POP software application. The POP Requester service can include software code that periodically requests updated state, event, and other data if such data has not been received in a specified period. For instance, the POP Requester service can be configured to request state data from the Presence API if no state data has been received for a given end user computing device for five minutes, or the POP Requester service can query the Event Database if no event data has been received for an end user computing device over the same period. The POP Requester service can be configured to request updates for other types of data at varying durations according to provider preferences. In this manner, the POP Requester service ensures the Adaptive Workspace interfaces receive and present updated data to end users.

The POP Requester software service also generates formatting data relating to the style and format of the AWS GUI displays. The formatting data is used by Workspace software code, which can be comprised of one or more software applications, to create the AWS GUIs that display end user presence, state, event, or other data according to predefined preferences. The AWS GUIs can accommodate a wide variety of display preferences set by the POP Requester service and implemented by the Workspace software code, such as: (i) changing the color of the agent tiles according to the presence or state, such as green for an On Call state, gray for an Off System or Break state, or blue for an Email state; (ii) changing the icons displayed on the tiles according to presence or state; (iii) changing the time durations that trigger a change in the AWS GUI displays, such as setting a specified duration of time for changing an end user tile from green to gray if updated presence or state data has not been received. The POP Requester software service associates the formatting data with the end user computing device state, event, and other data transmitted to the AWS POP software application. The AWS POP software application passes the formatting data to the Workspace software code to render the AWS GUIs, such as the intelligent monitor interface.

The AWS GUIs are also formatted in part using a Workspace Administrator Tool that controls what features are displayed by the AWS GUI. For instance, the various call buttons (e.g., Listen, Whisper, Barge, etc.) can be configured to be included or omitted on the Workspace intelligent monitor display. The Workspace Administrator Tool can include other features as well, such as setting permissions or seniority for various end users.

The GTID Customer Presence data category relates to the capture, retrieval, and analysis of data relating to customers who are participants to a shared experience. The Customer Tiles API receives customer data from various sources, such as a provider's Customer Relationship Management ("CRM") database, a Customer Satisfaction ("CSAT") database, a client's customer database, a third party ACD (e.g., a customer's telephone number or data entered into an IVR system), or from an analysis of event data (e.g., capture by the STDA, transcribed audio data or customer data entered into a provider database by an end user during a shared experience). In the embodiment described herein, historical customer data can be provided through an interface with the client's customer information database while more recent customer information and activity is gathered from provider maintained sources, such as event data or the provider CRM database.

The types of customer data can include, for instance, a customer identity, language spoken, location, purchasing history, account history, or status as a new customer, existing customer or "VIP" customer. The Customer Tiles API can provide an interface with the POP Requester software service that facilitates the display of customer data on customer tiles similar to the end user tiles within a Customer interface. The customer tiles can be grouped on the Customer interface according to line of business, product, location, or any other logical category. The customer tiles can also be displayed according to user customizable preferences, such as displaying VIP customers in green or new customers in blue.

In some embodiments, customer data for customers presently engaged in a shared experience can be displayed within the agent tiles in the AWS GUIs. As an example, the tiles can include a footer that displays the customer name, a customer location, a customer status as a "new customer" or "VIP" customer with extensive purchasing history, or other types of relevant customer information. The customer data is, therefore, made accessible to end users in a manner that facilities improvement in the shared experience and that helps guide provider and end user decisions, such as: (i) instructing agents to recommend the sale of products or services that would complement a customer's past product purchases or that would be useful in a customer's geographic location; or (ii) reducing customer friction by allowing a supervisor to know the customer's name and location prior to "Barging" into a shared experience.

The CTI data category, similar to the third party ACD data source, provides a wide variety of ACD data concerning incoming calls. The CTI DLG Feed, or Computer Telephony Interface Definity Land Gateway Feed, is an ACD data feed that provides a substantial volume of production call data from shared experiences. The CTI DLG Feed passes the ACD data to the CTI Listener software service, which provides an interface between the call data feed from the ACD system to the provider system. The ACD data from the CTI DLG Feed can include information concerning the current state of the end user computing device phone event source (e.g., On Call, On Hold, etc.) as well as a wide variety of additional data originating from the ACD system, as discussed above. The CTI Listener software service, among other functions, places the incoming ACD data in a form more readily usable by the AWS POP software application, such as correlating end user identifiers (e.g., a UPN or GUID) with the phone extensions received as part of the incoming ACD data from the CTI DLG Feed. The CTI Listener transmits the correlated ACD data to the AWS POP software application, which generates presence data for transmission to, and display by, the Adaptive Workspace.

The Agent Help Commands data category provides data relating to end user support requests submitted through the instant messaging software application, or Messaging Service Slash Command as shown in FIG. 11. End user computing devices initiate a support request by, for example, entering the "slash command," such as "/?" into the instant messaging application followed by the text or substance of the request. The support request data (e.g., an end user identifier, end user SAPL information, and the text or content of the request) is first routed to the Maestro software service. The Maestro software service initiates a knowledge tool application, such as a Knowledge Bot, to provide access to a knowledge database to provide the end user computing device with potential solutions to the support request. The end user computing device is prompted to indicate whether the solutions proposed by the knowledge application succeeded in resolving the support request. If so, and the issue is resolved, no further action is needed with regard to the support request.

On the other hand, if the issue underling the support request remains unresolved, the end user computing device provides input to the Maestro software service indicating the knowledge tool application did not provide a resolution. The Maestro software service passes the support request data to a Web Farm before ultimately being fed to the AWS Hub software service. The Web Farm provides load balancing, traffic scaling capability, routing functionality, and an API to the provider system from the Maestro software service. The Web Farm can, for instance, determine the identifier for supervisor computing devices with managerial responsibility over an agent that submitted a support request. The supervisor identifier is associated with the support request data and passed to the AWS Hub software service.

The AWS Hub software service functions similar to a switch and promptly passes the support request data to the Workspace without performing any processing so as to facilitate speed in processing a large volume of messages and requests. Additionally, the AWS Hub transmits data to the Adaptive Workspace System asynchronously so that support request data can be routed to the Adaptive Workspace System faster without waiting for periodic polling.

Support requests can be "public" or "private" messages. Public support request messages, for example, are transmitted to a broader group (i.e., all end users at a site or that are on duty and working on a line of business). Private support requests messages on the other hand can be directed to a specific end user of the Adaptive Workspace System. For public requests within the Adaptive Workspace System, the support request data is transmitted to all end users of a particular grouping. The supervisor identifying data associated with the support request data is used by the Adaptive Workspace System to display the support request data on those end user computing devices associated with a supervisor having managerial responsibility over the end user that originated the support request and that have AWS GUI display preferences enabled to view the support request data. The support request data can be displayed on end user computing device AWS GUIs in a sequential order of priority according to a Recommendation Matrix.

The Recommendation Matrix data source category shown in FIG. 11 provides a data matrix that facilitates efficient routing of support request data from end users (typically agents) to other end users (typically supervisors) most suitable or qualified to resolve the support request. The Recommendation Matrix is generated by a Recommendation Engine software process based on historical data using two analytical techniques—collaborative filtering and content-based filtering. The operation of the Recommendation Engine analysis can be illustrated with the example shown in FIG. 12.

Figure 12:
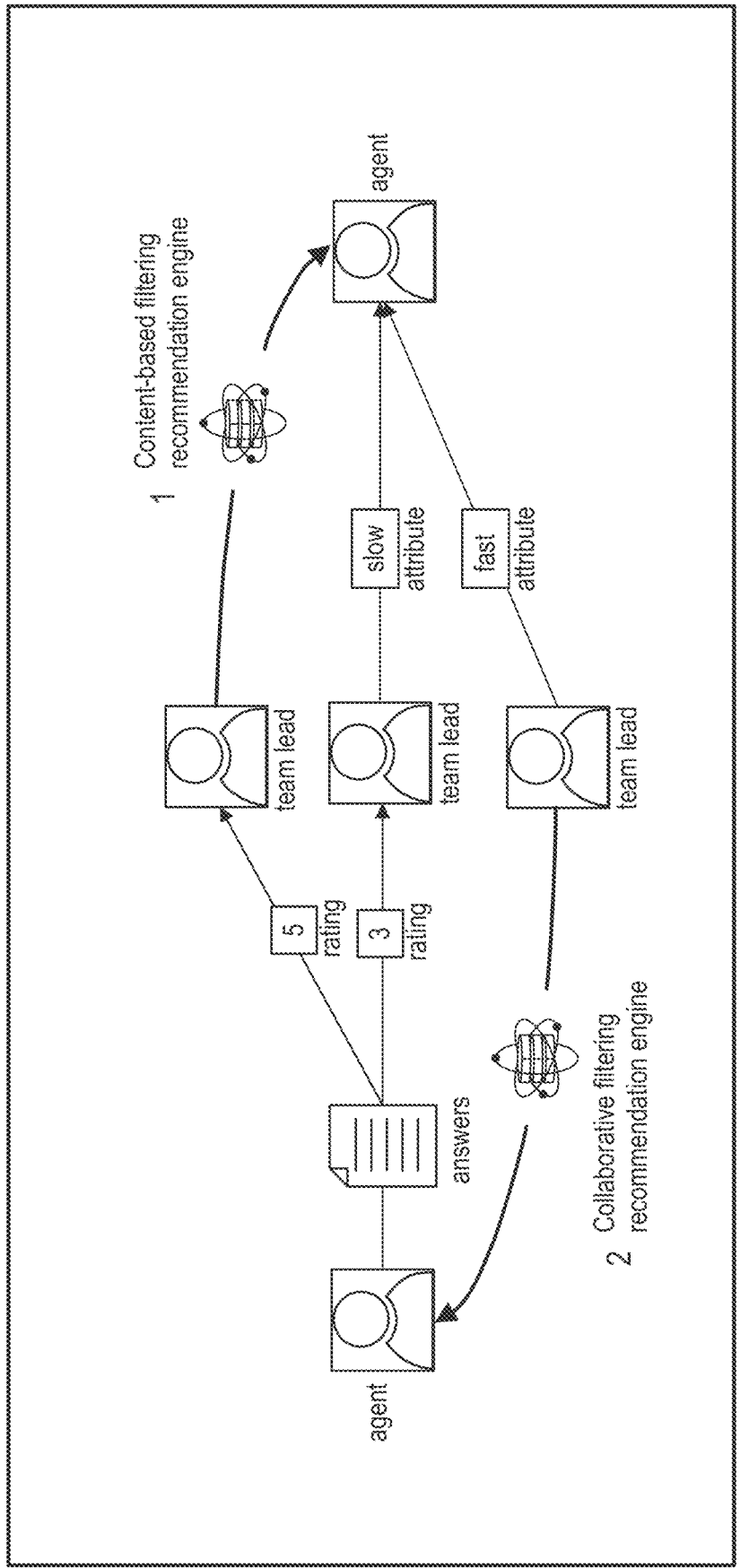
FIG. 12 illustrates a Recommendation Engine.

In example shown in FIG. 12, an end user submits a support request through, for instance, an instant messaging software application. The support request is routed to multiple supervisor computing devices, and three of the supervisor computing devices provide a response after varying durations of time (i.e., some supervisors answer faster than others). In FIG. 12, the middle supervisor, or "team lead," provides a slower response than the team lead shown at the bottom of the figure. The supervisor response time data is stored to a database and later used as part of the process for generating the Recommendation Matrix. Utilization of response times is a collaborative filtering analysis technique based on supervisor attributes (i.e., slow or fast response times).

After receiving responses to a support request, the agent computing device is provided with a survey that allows an agent to rank or rate the quality of responses received from the supervisor computing devices. In the example shown in FIG. 12, the response provided by the upper-most team lead receives a higher rating of "5" than the middle team lead receiving a rating of "3." The rating data is also stored to a database for use by the Recommendation Engine in generating the Recommendation Matrix. Use of the rating data is a content-based filtering analysis technique relying on the substance of the response, not an attribute of the responding supervisor.

The response time data and rating data are received by the GTI API (shown as the GT Ingress in FIG. 11), which transmits the data to the Data Science Analytics software service for storage to a database. The Data Science Analytics software process can rely on machine learning techniques implemented by a Recommendation Engine software process to analyze the response time data and rating data to generate the Recommendation Matrix. The Recommendation Matrix consists of data identifying each end user computing device correlated to a list of supervisor computing devices best suited to respond to support requests from the particular end user (i.e., the supervisors with whom the agent collaborates most effectively). The Recommendation Matrix is passed from the Data Science Analytics software process to the Workspace® API software service before being transmitted to the Adaptive Workspace System for storage to a database and use in routing support request data.

The list of suitable supervisor computing devices within the Recommendation Matrix is ranked in an order of preference such that the Workspace software application will first display the support request data to the highest ranked supervisor computing device. The support request data can be displayed, for example, on the intelligent monitor interface of FIG. 4 by promoting the tile associated with the end user that originated support request to the recommendation panel 440 along with an alert (e.g., a tile color change, question icon, etc.). If a support request is not answered within a specified period (e.g., ten seconds), then the Workspace removes the tile from the recommendation panel 440 of the first ranked supervisor computing device and displays the support request to a recommendation panel 440 associated with the next highest ranked supervisor computing device. In this manner, the Workspace can avoid overwhelming the supervisor computing devices with support requests and can promote efficiency by both avoiding duplicative efforts in responding to support requests and ensuring the most suitable supervisor computing devices are given an opportunity to respond to the requests.

The Adaptive Workspace System can be configured to perform additional recommendation checks as well during support request routing, such as determining whether the supervisor computing devices listed in the Recommendation Matrix have presence data or state data indicating the supervisor computing device status is On System, Off System, On Call, Off Call, or other status that would impact the availability of the supervisor computing device to respond to the support request. The additional recommendation checks and further promote efficiency and avoid wasted time by not routing support request data to supervisor computing devices having presence data or state data indicating they are unavailable, which could otherwise result in customer friction by keeping the customer waiting.

The End User Performance data category shown in FIG. 11 relates to end user performance data such as those shown on the agent blackboard 450 of FIG. 4. In one embodiment, the end user performance data can be determined by an ACD system or by a separate End User Performance software process that conducts a performance analysis to yield the performance data. In cases where performance data is received by an ACD system, the performance data is stored to the Global Data Warehouse (GDW) database at periodic intervals, such as every thirty (30) minutes. Upon selection by a User of the Preview function shown in FIG. 4, the AWS Tile Feed software application utilizes current ACD data, event data, or other data to conduct a performance analysis that yields the performance data. The AWS Tile Feed retrieves the performance data from the GDW database and aggregates the stored performance data with the calculated recent performance data before passing the aggregated performance data to the Workspace for display.

To illustrate the performance analysis, the performance analysis can include determining the number of calls fielded by an end user by calculating the number of start call events received with distinct GTIDs or the number of incoming call answer events received as part of the ACD data. The average handle time for such call can be determined based on the duration of time between receipt of a start call event and an end call event with the same GTID. The end user performance metrics are typically displayed as measured over a specified time period, such as data gathered over the course of a work shift or calendar day. The end user performance metric data can include, but are not limited to: (i) instances of Redirect on No Answer ("RONA"); (ii) end user split; (iii) the average duration of after-call wrap up activities; (iv) AHT; (v) number of calls or shared experiences handled by the end user; (vi) the number of customers placed on hold; and (vii) other metrics shown on the agent blackboard 450 and known to those of skill in the art.

The Workspace Roster data category represents end user computing devices having attributes and performance data displayed by the Adaptive Workspace System. The Workspace Roster data is retrieved by the ADA API software application from an ADA Database and includes end user identifiers as well as associated attribute information, such as SAPL data associated with the particular end users. The Workspace Roster data can additionally include relational data that correlates given end user computing devices to particular supervisor computing devices, provider sites, accounts or clients, programs, or lines of business. In this manner, the Adaptive Workspace System can display given end user computing devices on the AWS GUIs of the proper associated supervisor computing devices as tiles on the intelligent monitor interface. The ADA Database can also include a variety of end user attribute data, such as an end user's location, skill level, status as a remote agent, or the like.

In the provider system illustrated in the attached figures, the Workspace Roster data stored to the ADA Database is passed by the ADA API to the GDW Database, which functions as an intermediate database that stores replicated tables of Workspace Roster data. The GDW Database does not alter the Workspace Roster data or other data received from the ADA API. Instead, GDW Database provides intermediate storage and access functions that enhance system functionality. The GDW database is secure and functions faster than the ADA Database, which might contain a larger data set of provider personnel data than used by the Adaptive Workspace System (i.e., provider personnel not directly engaged in providing customer service). The Workspace® API service periodically queries team roster data and end user attribute data from the GDW database, such as every 30 minutes, and stores the received data to a temporary memory storage or cache before passing the data to the Workspace. In this manner, the Workspace software is not required to expend resources routinely or frequently querying the GDW database.

The GDW Database also receives Remote End User Presence data from the VPN Service software application, as illustrated in FIG. 11. The Remote End User Presence data identifies the end user computing devices that are accessing the provider system through a remote connection, such as a Virtual Private Network, Virtual Desktop, or other remote connection means. The status of an end user computing device as being remotely connected to a provider system can be indicated on the AWS GUIs by, for example, by outlining the tile with a dashed line, as illustrated in FIG. 9A, or displaying a particular icon on the tile.

The GDW Database passes the Workspace Roster data and the Remote End User Presence data to the Workspace® API Service, which passes configuration data to the Workspace. Upon an end user computing device commencing use of the Adaptive Workspace System and initiating an instance of an AWS GUI, the configuration data is used to determine, among other things: (i) the permissions of the end user computing device (e.g., what data and functions are accessible to the end user computing device); (ii) what agent tiles to display; (iii) what client accounts are accessible; or (iv) display settings such as tile colors, icons, etc.

The Intelligent Offers data category shown in FIG. 11 relates to survey data collected from end users following a shared experience. In the embodiment depicted in the attached figures, survey questions are sent to end user computing devices following the submission of a support request through the instant messaging application. As discussed above, following the submission of a support request, the Maestro software service is called to present knowledge tools to the end user. The intelligent offers process can "piggy back" on this process and utilize the Maestro software service to set a survey flag when a support request is submitted. The survey flag can be set every time a support request is submitted. Or the survey flag can be set according to predefined parameters and conditions, such as setting the survey flag a specified percentage of the time that a support request is submitted or when certain conditions are met, such as when the support request is directed to a particular product or answered by a particular supervisor computing device, or any other relevant condition.

When the survey flag is set, the Maestro software service transmits a message providing notice of the survey flag to the Web Farm, which routes the survey flag to the CTI Listener software service. The CTI software service stores the survey flag and sends a message to the First Survey software application after receiving state data or event data indicating that the shared experience has ended such that the end user computing device is then available to complete a survey. The First Survey software application generates the survey data as a series of questions or as a redirect to a website that implements the survey, and the First Survey software application transmits the survey data to the Adaptive Workspace System for delivery and display to an end user computing device.

The End User Program Tenure data category represents data concerning end user attributes, such as an end user's tenure working for a particular provider client, program, or line of business. The End User Program Tenure data can be stored to a third party database source, and delivered to the Adaptive Workspace System by the Aspire API software service shown in FIG. 11, which provides an interface between the Adaptive Workspace System and the third party database source.

The Workspace data inflows shown as part of the GTID End User Presence data category shown in FIG. 11, can include data relevant to monitoring end user attendance and idle activity. End users can optionally be required to "clock in" and "clock out" using a Clock Monitor software application event source as part of reporting for work or concluding a shift. After authenticating or logging into to a provider system, end users launch a Clock Monitor software application and select a Clock In function to report to work. Similarly, at the conclusion of a shift, end users are required to select a Clock Out function as part of completing a shift. Selection of the Clock In and Clock Out functions is transmitted to the GTID as event data or "Clock Monitor event data" and includes, among other information: (i) a time stamp; (ii) an event identifier (i.e., clock in or clock out event); (iii) an event source identifier (i.e., Clock Monitor software application); and (iv) a UPN or GUID for the end user or end user computing device.

The AWS POP software application processes the Clock Monitor event data through a presence analysis that relies, for example, on Presence Rules Engine software code or another suitable analytical technique known to those of skill in the art, such as machine learning techniques. The AWS POP software application determines an end user computing device presence data value as either On Clock or Off Clock. The AWS GUIs can depict the Clock Monitor presence data value using, for example, a punch-card icon on the end user tile, such as the icon shown in FIG. 4 in the upper left side of the tiles for Agents 8 and 9.

An Alert Monitor software process can be configured to display an alert based on the presence data from the AWS POP software application and the Clock Monitor presence data value. The Alert Monitor software process can include Alert Rules Engine software code that processes the Clock Monitor presence data value and other presence data to recognize at least one trigger condition associated with an end user computing device. On recognizing a trigger condition, the Alert Monitor software process can generate clock alert data that is sent to the Workspace for processing by Workspace software code that can generate related alerts or assign a MicroTask.

The Workspace also receives team roster data from the GDW Database where the team roster data includes a supervisor computing device identifier associated with the end user computing device. The Workspace can display the clock alert data on an AWS GUI as a change in color for the end user tile border, displaying an icon associated with the end user tile, or using another suitable display technique. Further, a MicroTask can be sent to the supervisor computing device having managerial responsibility for the end user where the MicroTask includes instructions for following up with the end user to investigate or resolve the potential noncompliance with the clock in or clock out requirement.

To illustrate the clock monitor alert function, if an end user is logged into the provider system as determined by the presence data but not clocked in, or an end user does not clock out at the conclusion of a shift, the corresponding end user tile can be displayed as bordered in red, having an interior red color, or another suitable indicator. Another trigger condition could be, for example, if an end user is clocked in but not logged into the provider system. A supervisor could then investigate and determine whether the end user clocked in but then sat idle, whether the end user had a work-related meeting that did not require logging in to the provider system, or whether there is another explanation for the trigger condition.

The Workspace data inflows shown as part of the GTID End User Presence data category shown in FIG. 11, can additionally include information concerning potential end user activity or idle periods. The STDA software application can monitor the end user desktop activity to detect keystrokes, mouse movement, the selection or "highlighting" of windows or software application interfaces, or other indicia of activity conducted by an end user associated with the end user computing device. Upon detection of no activity for a configurable predetermined period, such as fifteen (15) minutes, the STDA software application can transmit activity event data to the GTID indicating an idle state has been detected. The activity event data can include information such as: (i) a time stamp for when the predetermined activity period was triggered; (ii) an event identifier (i.e., no activity detected); (iii) an event source identifier (i.e., STDA); and (iv) a UPN or GUID for the end user or end user computing device. Upon detection of activity following a period of inactivity, the STDA can transmit activity event data to the GTID indicating that activity has been detected.

The AWS POP software application processes the activity event data and determines an end user computing device activity presence data value as either Active or Inactive. The AWS GUIs can depict the activity presence data using, for example, an inactive "Zzz" icon on the end user tile, such as the icon shown in FIG. 4 for Agent 10. Workspace software code can also trigger an alert using an Alert Monitor software process that incorporates Alert Rules Engine software code to recognize a trigger condition associated with an end user computing device, or the Alert Monitor software process can utilize other suitable analytical techniques known to those of skill in the art. Upon recognizing a trigger condition, the Alert Monitor software process can generate activity alert data that is passed to the Workspace for display by changing the appearance or position of the end user tile, for instance. The Workspace could also transmit a MicroTask to the computing device used by the supervisor with managerial responsibility over the end user. The MicroTask can include instructions to be implemented by the end user computing deviance that requires the supervisor reach out to the end user or otherwise investigate the inactive condition.

The data inflow to the Workspace can additionally include an End User location data category shown in FIG. 11. The end user location information can be used to verify whether an end user is attempting to authenticate or log into a provider system from an unknown location, which could indicate a security risk, a violation of provider remote-work policy, or some other condition requiring further investigation and analysis. Upon authenticating to a provider system, a Login API captures the end user Internet Protocol ("IP") address. The Login API can pass the IP address to an IP Location Lookup API to determine current location data relating to the location of the end user computing device associated with the detected IP address, such as the city, state, county, zip code, country, or some other geographic region. Those of skill in the art will recognize that other embodiments could use additional or alternative techniques to determine current location data for an end user computing device, such as geolocation data from a GPS device integrated with the end user computing device or a hardware or software identifier associated with the local network used by the end user computing device. The current location data can be stored by the UserStatus API to a User Status database.

The ADA Database can provide information concerning the end user's expected work location, such as a home address or city for an end user that typically works from home or a provider site location for an end user expected to report for work at a given provider location. The end user current location data and expected location data from the ADA Database are passed to a Compliance API. The Compliance API performs a location analysis to determine location compliance data indicating whether or not the end user current location deviates from the expected location data. The Compliance API can pass the location compliance data as well as the current location or expected location data to the Workspace for display to end users as part of an end user tile, display on the blackboard 450, the creation of an alert, or the creation of a MicroTask transmitted to a supervisor computing device with instructions to investigate a noncompliance condition. Display of current location data is illustrated in FIG. 4 where the blackboards 450 for Agent and Agent 2 indicate locations of Charming, California and Denver, Colorado respectively.

Data Outflows from the Adaptive Workspace

Figure 13A:
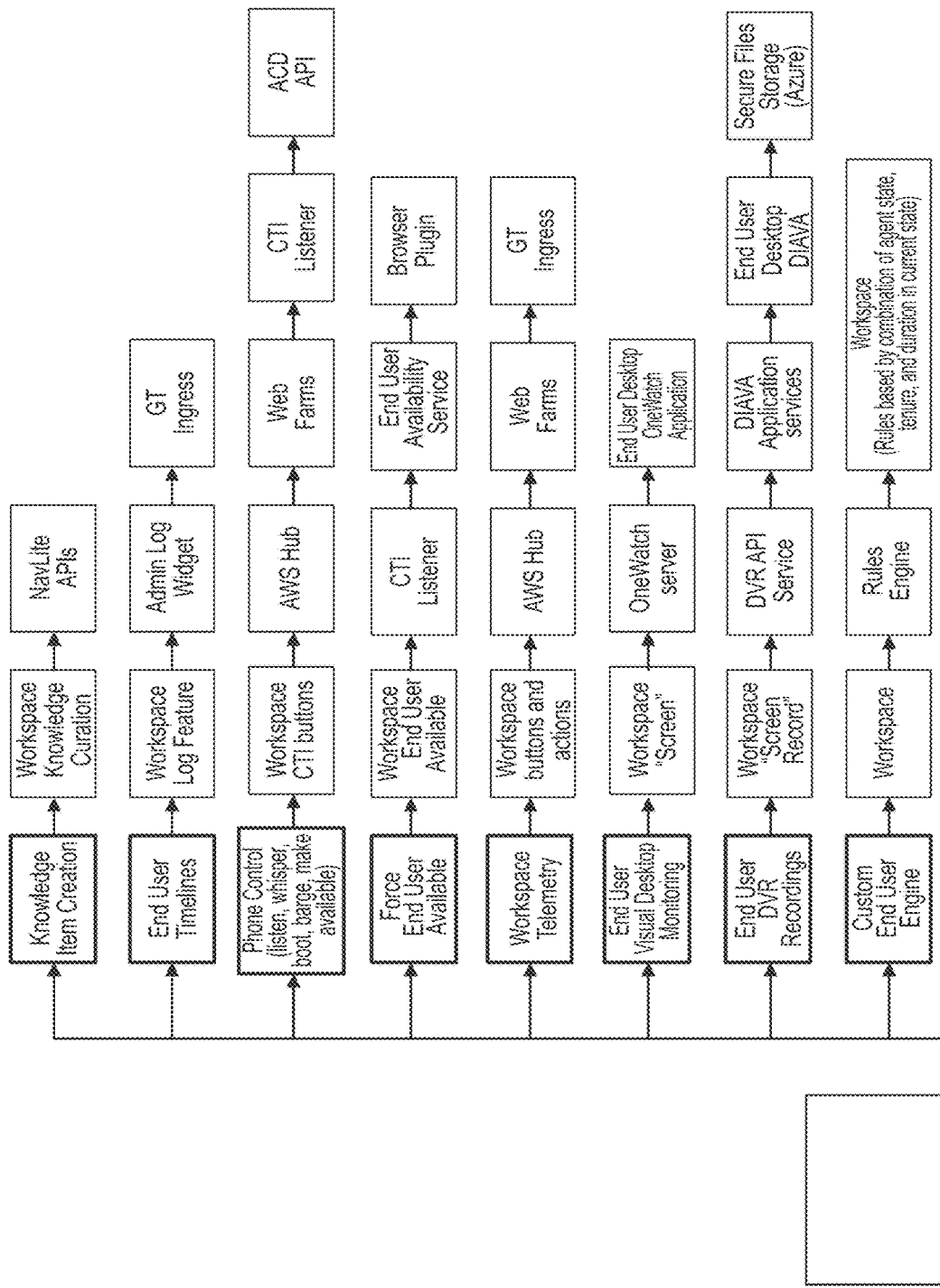
FIG. 13A illustrates data outflows from an Adaptive Workspace.
Figure 13B:
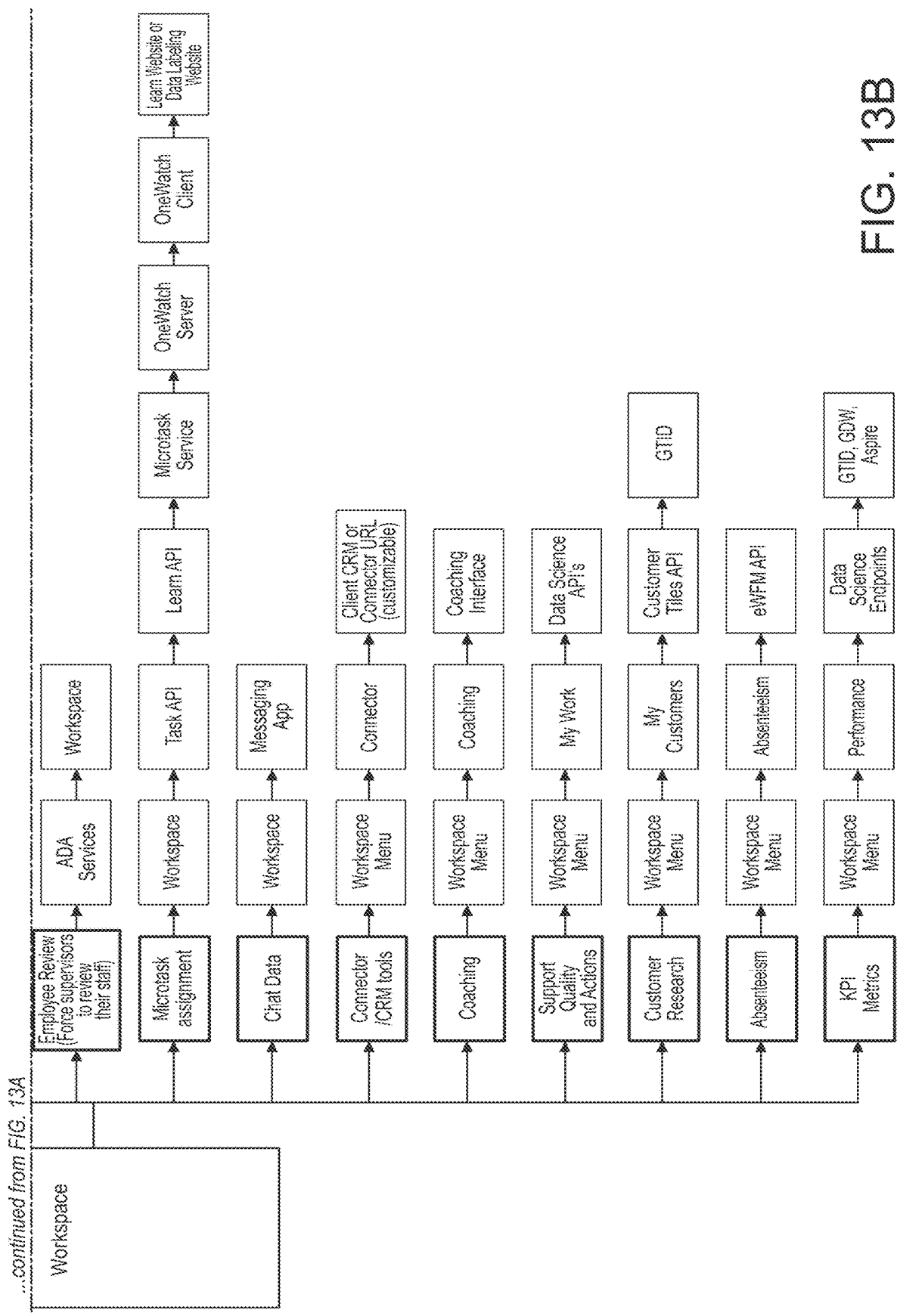
FIG. 13B illustrates data outflows from an Adaptive Workspace.

The categories of data outflow, or outputs, and the software processes that implement the data outflow are illustrated in FIGS. 13A and 13B. The data outflows include the various functions and information available through the AWS GUIs, including the intelligent monitor interface, among other interface displays discussed above. The outflow data can be represented through various graphical means, such as graphs, icons, tables, charts, and the like.

The Knowledge Item Creation data category shown in FIG. 13A is implemented by a Workspace Knowledge Curation software process. The Workspace Knowledge Curation process gathers, for example: (i) knowledge feedback data from end user computing devices concerning solutions that successfully or unsuccessfully addressed customer issues raised during a shared experience; and/or (ii) knowledge tool effectiveness data concerning the effectiveness of knowledge tools called by the Maestro software service and utilized by end user computing devices during a shared experience. The knowledge feedback data and knowledge tool effectiveness data are stored to a Navlite database and can be organized according to provider site, program, line of business, and/or client to facilitate efficient access to relevant data.

The data stored to the Navlite database can be accessed by knowledge tool software applications during subsequent shared experiences and used to determine potential solutions to support requests that are delivered to the end user computing devices. Thus, Workspace Knowledge Curation software process enables the continuous improvement in knowledge tool software application performance by improving the knowledge tool's ability to identify and present effective solutions.

The Workspace Knowledge Curation software process relies in part on labeled answer and solution pairs stored to a Knowledge Curation database that is searched using artificial intelligent techniques to identify the appropriate solutions to issues and questions raised by an end user during a shared experience. As discussed above, upon entering a support request command into an instant messaging software application, the Maestro software service calls a knowledge tool software application that presents to the end user computing device one or more solutions to the support request.

In instances where the presented solutions were not effective, the support request is routed to a supervisor computing device. After the shared experience concludes, a supervisor that responded to a support request can be prompted by the Workspace Knowledge Curation software process to input data and information regarding the shared experience and knowledge tool effectiveness into the Navlite database for further analysis and utilization during subsequent calls to knowledge tool applications. The supervisor can enter knowledge tool effectiveness data such as: (1) the date of the shared experience; (2) the question asked of the knowledge tool software application; (3) the knowledge tool software application's answer; (4) the agent's answer to the knowledge tool software application as to whether the knowledge tool software application was correct; (5) a reason for the knowledge tool software application's error, if known; (6) the topic or subject matter of the knowledge tool software application question; (7) the action required following the error; (8) the source of the actual solution or correct answer to the agent's original question; (9) or any other data and information useful for analyzing the knowledge tool software application interaction.

Figure 14:
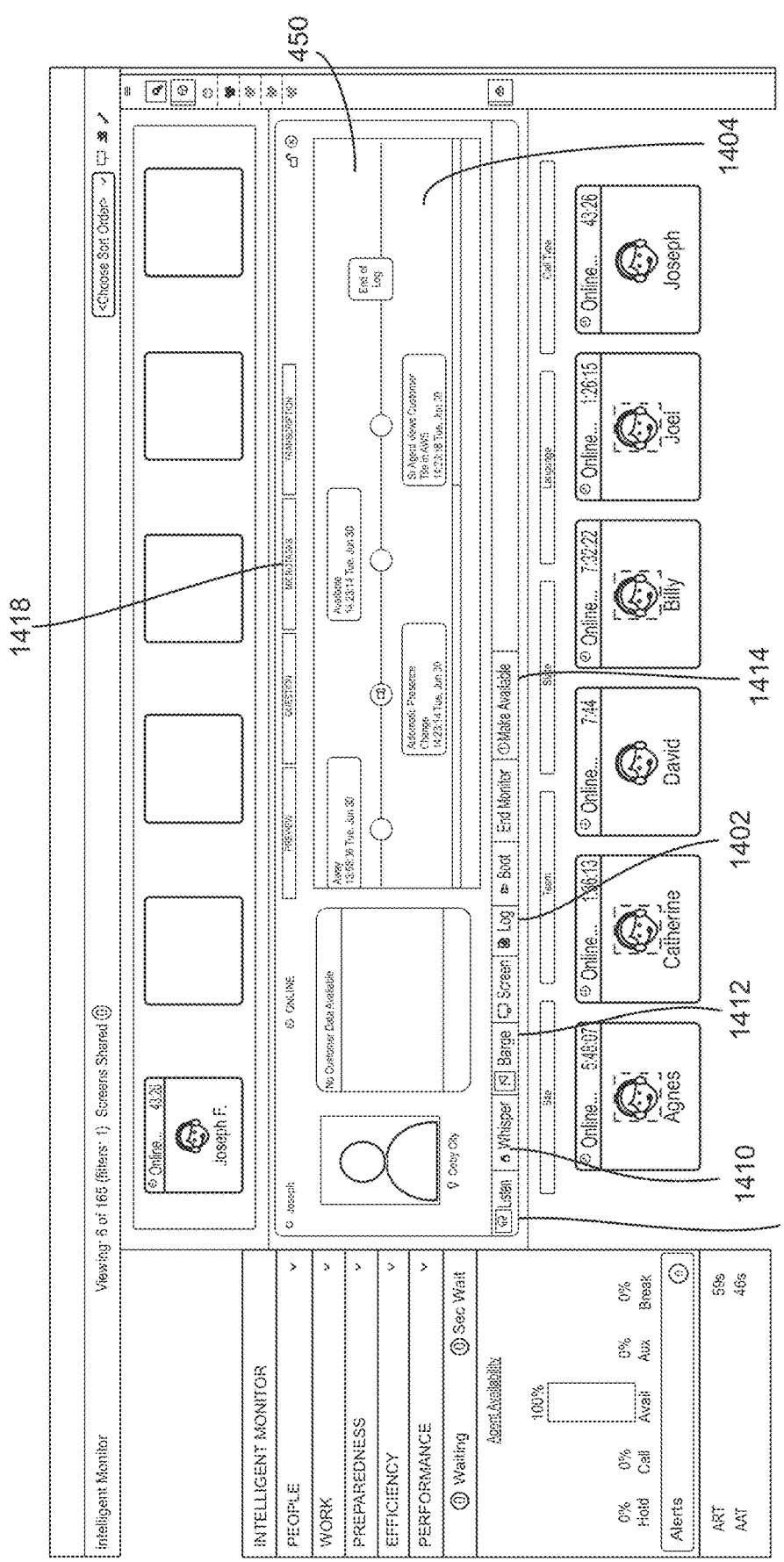
FIG. 14 illustrates an example workspace log displayed on an agent blackboard.

The End User Timelines data category shown in FIG. 13A relates to data displayed upon selection of the Workspace Log Feature, which is shown as the Log function 1402 at the bottom of the agent blackboard 450 in FIGS. 4 and 14.

Selection of the Log 1402 function calls the Admin Log Widget, which renders a log of events performed by an end user computing device. The Admin Log Widget captures event data from the provider Foundational Analytics system shown as the GT Ingress in FIG. 13A. The Admin Log Widget formats the captured event data for display as an event timeline 1404 within the agent blackboard 450 depicted in FIG. 14 to provide a graphical depiction of end user activities.

The Phone Control data outflow category shown in FIG. 13A relates to the Listen 1408, Whisper 1410, and Barge 1412 Make Available 1414 functions shown in FIGS. 4 and 14. Selection of these functions, as indicated by the Workspace CTI buttons in FIG. 13A, results in a CTI Phone Control request message (e.g., a Listen request message, Whisper request message, Barge request message, etc.) being sent to the AWS Hub. The CTI Phone Control request message can include data relevant to the ACD system executing the requested phone control function, including, but not limited to, an identifier for the end user computing device that initiated the request message or an identifier for the end user computing device that is the target of the Phone Control request message. The AWS Hub forwards the Phone Control request message asynchronously in real-time to the Web Farm. The Web Farm provides, load balancing, scalability, and routing functionality and passes the CTI Phone Control request message to the CTI Listener API.

The CTI Listener API provides an interface to the applicable ACD system by receiving commands, requests, messages, and other data entered by the end user computing device into the AWS GUI and formatting those commands as a message readable to the applicable ACD system. The CTI Listener API receives the CTI Phone Control request messages (e.g., a Listen request message, Whisper request message, Barge request message, etc.) entered by end user computing devices. The CTI Listener software formats the CTI Phone Control requests messages into commands, requests, messages, and other data readable by the ACD system, such as a Listen command, a Whisper command, or a Barge command. The CTI Listener API can incorporate the additional information useful to the ACD system, such as the end user's phone extension and an ACD Switch identifier, as shown in FIG. 8. The CTI Listener API can additionally perform a variety of other functions that enable or facilitate communication with the ACD system, such as registering with the ACD system through the exchange of credentials (e.g., a certificate, token, etc.), establishing a VPN or other secure connection, or handling encryption or other security protocols.

Upon receiving commands from the CTI Listener API, the ACD system executes the function selected by the end user computing device. For instance, the end user might be a supervisor computing device that selects the Listen 1408 function, which transmits a Listen request message to the CTI API that includes a supervisor computing device identifier, phone extension, or a target agent computing device identifier. The CTI Listener API translates the Listen request message into a format readable by the ACD, such as mapping the supervisor and agent UPNs or GUIDs to phone extensions useable by the ACD system. The ACD system then executes the appropriate functionality to allow the supervisor phone event source (i.e., physical phone, VIT, or Voice-over-IP phone) or computing device audio system interface to "listen" by receiving audio data of a shared experience in which the agent computing device is participating.

The Force End User Available data category shown in FIG. 13A represents the implementation of the Workspace End User Available feature through selection of the Make Available 1414 function on the agent blackboard 450 of FIGS. 4 and 14. The Make Available 1414 function forces an end user computing device with presence data indicating the device is in an unproductive presence into an available status.

The determination of what presence values are considered unproductive is configurable and could include circumstances where, for example, an end user computing device has been in an On ACW status or an On Break status for too long or where the end user computing device is engaged in a training MicroTask but is now needed for a shared experience. The Make Available function can additionally include logic that precludes an end user computing device having a particular presence from being forced into an available status, such as when the end user computing device has an On Call status indicating the end user is engaged in a shared experience. Recognizing certain presence values as unproductive and exempting certain presence values from being forced available, operate to minimize to minimize disruption to customer service by ensuring end users are not engaging a customer at the time the end user computing device is subjected to the Make Available function.

Selection of the Make Available 1414 function on an end user computing device results in the Adaptive Workspace System generating a make available request message that is transmitted to the CTI Listener API. The CTI Listener API passes the make available message to the End User Availability Service software application, which then passes the message to the Browser Plugin software for execution. The End User Availability Service provides an end point for the CTI Listener API and an interface to the Browser Plugin, which is a software plugin to an Internet browsing software application. In some embodiments, the Adaptive Workspace System GUIs or the instant messaging software application can be displayed as part of an Internet browsing software application. In that instance, to facilitate communication with the Internet browsing software application, the CTI Listener API may be registered with the Internet browsing software application through the End User Availability Service.

The Workspace Telemetry outflow data category shown in FIG. 13A represents event data captured from the end user computing device and processed by the provider's foundational analytics system. Similar to other data sources, the Adaptive Workspace System represents a proprietary software application that generates event data through selection and performance of "Workspace buttons and Actions" shown in FIG. 13A (i.e., the selection of inputs on the AWS GUIs). The Adaptive Workspace System transmits the event data to the AWS Hub software service and then through a Web Farm before being routed to GTI API, represented by the GTI Ingress box shown in FIG. 13A.

Figure 15:
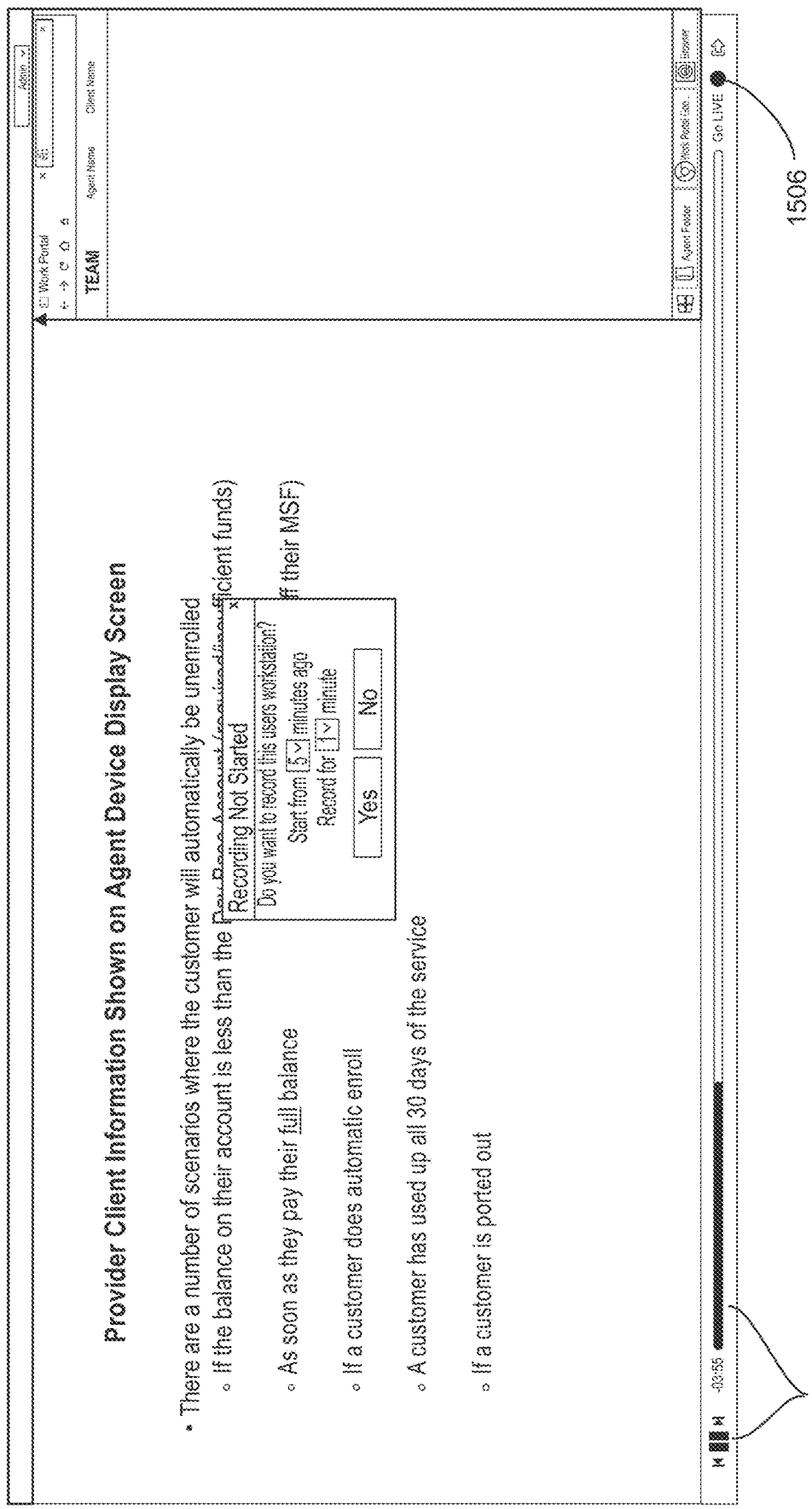
FIG. 15 illustrates an example end user screen capture interface.

The End User Visual Desktop Monitoring category shown in FIG. 13A represents capturing an end user computing device display screen (usually an agent device) and streaming the capture to one or more separate end user computing devices (often a supervisor device). The display screen capture is initiated by selecting the Screen 1416 function on the agent blackboard 450 shown in FIGS. 4 and 14. Selection of the Screen 1416 function is depicted as the Workspace "Screen" step in FIG. 13A. An exemplary end user computing device screen capture is depicted in FIG. 15 and appears similar to a video media player with playback functions 1502.

Selection of the Screen 1416 function results in sending a Screen request message to the Onewatch Server that includes a UPN or other identifier for the target end user computing device for which the display is to be captured. In response to receiving the Screen request message, the OneWatch Server transmits a Screen Share command to an End User Desktop OneWatch Application running on the target end user computing device. The End User Desktop OneWatch Application software performs the video data capture and streams screen share video data back to the OneWatch server where the screen share video data shows what is occurring on the target end user computing device desktop or display screen. The OneWatch server can stream received video data of a display screen to one or more end user computing devices. This feature increases network efficiency by dedicating resources to the streaming of video data and by reducing the number of video data feed streams being transmitted from an end user computing device in instances where multiple end user devices are receiving a stream of video data.

The streaming of video data can also be initiated when an end user computing device performs screen sharing by selecting the screen sharing function 419 shown in FIG. 4. The screen sharing function 419 initiates the End User Desktop OneWatch Application that begins streaming video data from the end user computing device display to the Onewatch Server. The End User Desktop OneWatch Application can include a function that permits the end user to designate one or more other separate end user computing devices to receive the video stream. The Onewatch server can transmit the received video data to one or more separate end user computing devices designated by the end user computing device that initiated the video data stream to share the display screen.

The End User DVR Recordings data category shown in FIG. 13A relates to the recording and storage of video data captured from an end user computing device display screen. The system depicted in the attached figures continuously captures and saves video data from end user display screens to a temporary storage buffer managed by the DVR API Service software application. While reviewing screen share video data following selection of the Screen 1416 function, an end user can select a Workspace "Screen Record" function 1506 illustrated in FIG. 15 to transmit a record request message to a DVR API Service software application to initiate the process of storing the screen share video data to a DVR Recorder database for longer term storage outside of the temporary storage buffer. The DVR Recorder database can be implemented by a Secure Files Storage cloud storage system. Upon selection of the Workspace Screen Record function 1506, the end user computing device presents the end user with options to record a specific time period within the temporary storage buffer, such as recording for the prior five minutes of a shared experience and for the next ten minutes going forward. An exemplary interface for specifying the recording period is shown in FIG. 15 as the Recording Not Started popup interface.

Selection of the DVR Screen Record function and receipt of a record request message by the DVR API software application causes the DVR API Service to transmit a record request message to the Digital Insights Audio Video Agent Application Service ("DIAVA Application Service"), as shown in FIG. 13A. The DIAVA Application Service software provides an interface with the target end user computing device End User Desktop DIAVA software application, which initiates the streaming of screen share video data constituting the recording to the DVR Recorder database from the target end user computing device display screen. Once the screen share video data is recorded to the DVR Recorder database, the DVR API Service software application appends a tag clip identifier and/or machine label data to the screen share video data or associates the tag clip and machine label data to the screen share video data in a relational database. A tag clip can be a unique alpha numeric identifier for a shared experience taking place during a recording. The machine labels include relevant event data, such as provider client data, an end user telephone number, an end user UPN, time and date data, a customer telephone number, or other customer data.

After the screen share video data is stored to a permanent database, a DVR Slicer software application applies time codes to the video data to facilitate review of the video data in a video playback software application according to time frames (i.e., minutes and seconds). A Video Redaction software application can be called to redact sensitive information from the video data, such as customer credit card numbers or identifying information. The video data is then encrypted before being stored to the DVR Recorder database implemented by a Secure Files Storage system, as shown in FIG. 13A.

The Custom Alert Engine outflow data category of FIG. 13A relates to the customization of alerts. Alert customization can be accomplished by selection of the My Alerts function on the Options interface of FIG. 7, which is represented as the Workspace step in FIG. 13A. Selection of the My Alerts function opens a separate Alerts Maintenance interface, such as the example interface shown in FIG. 16. As discussed above, customized alerts can be created to trigger according to end user computing device presence or state data, the duration such state has persisted, end user tenure with the provider, or other criteria. Alerts can be configured to display on an AWS GUI through a change in interior or border color of a tile, change in position of a tile, an icon displayed within a tile, or other types of displays known to those of skill in the art. Alerts can be set at a system level so that they are displayed uniformly to all end users or particular groups of end users, or the alerts can be individualized for display only to a particular end user computing device.

Entering customized alerts using the Alerts Maintenance interface can result in the Pop Requester software application creating alert display data that is associated with one or more end user computing devices depending on whether the alerts are created at a system level or individual level. The alert display data can be passed to a Rules Engine software application that incorporates software code that reads the alert display data and creates software-based triggers utilized by the Adaptive Workspace System to detect the alert conditions through monitoring of the event data, presence or state data, ACD data, or other types of available data. The Rules Engine software application passes the software-based triggers to the Adaptive Workspace System designated as the Workspace in FIG. 13A.

The Employee Review data category in FIG. 13B relates to the Team Roster interface shown in FIG. 5 available through selection of the UPN function 416 shown in FIG. 4. The Team Roster interface enables supervisor computing devices to review associated agents over which the supervisor has managerial responsibility and to reassign agents to other appropriate supervisors if, for example, the agent has been incorrectly assigned to a given supervisor. The agent identifiers and associated supervisor identifiers are stored to an ADA database and retrieved from storage by the ADA Service software application. The ADA Service software application provides an interface to the Adaptive Workspace System, shown as the Workspace in FIG. 13B, and passes the agent identifiers and associated supervisor identifiers to the Adaptive Workspace System for display.

The MicroTask assignment outflow data category shown in FIG. 13B relates to the assignment of MicroTasks to end user computing devices. MicroTasks can be assigned through selection of the MicroTask function 1418 shown in FIGS. 4 and 14, which is depicted as Workspace in FIG. 13B. Selecting the MicroTask function 1418 calls the Task API software application. The Task API software application retrieves learning data from the Learn API concerning the MicroTasks available to an end user computing device. The Learn API can access a learn database with learn data indicating, among other things, whether: (i) there are mandatory MicroTask trainings for assignment; (ii) an end user computing device partially finished a training MicroTask that should be completed; (iii) there are MicroTask trainings recommended for an end user based on past performance during shared experiences; or (iv) any other data useful for selection of MicroTasks to assign to end user computing devices.

The Task API software application can process the learn data and display to an end user a list of MicroTasks available for selection and assignment. Upon selection of a MicroTask for assignment, the Task API software application can retrieve from a database or generate a MicroTask. The MicroTask can be a series of instructions to be performed by an end user computing device that implements a training module, such as a series of questions and answer inputs or a shared experience simulation. The MicroTask can also be implemented as a redirect command that redirects an end user computing device Internet browser software application to a website that implements the training module. The Task API passes the MicroTask to the MicroTask Service, which in turn passes the MicroTask to the OneWatch server for distribution to the OneWatch Client software application running on the end user computing device to which the MicroTask is assigned. The OneWatch Client software application runs the MicroTask on the end user computing device.

The Chat Data outflow data category of FIG. 13B relates to an instant messaging software application integrated with the Adaptive Workspace System interface. An example instant messaging interface 470 is depicted in FIG. 4 as being displayed within the intelligent monitor interface to enable real time communication between and among end user computing devices.

The Connector/CRM Tools outflow data category of FIG. 13B represents a Customer Relationship Management ("CRM") interface embedded in the Adaptive Workspace System that permits end user computing devices to review, input, and edit CRM data relating to customers participating in shared experiences. The CRM interface can be accessed through a Workspace Menu located in the side bar menu tree 420 depicted in FIG. 4. End users can utilize the CRM interface to enter a wide variety of CRM data relating to a customer, such as customer preferences, purchase history, or support request history. The CRM data is stored to a CRM database and can be accessible to other end user computing devices during subsequent shared experiences with the same customer or utilized in a provider's analysis of shared experiences. In some embodiments, the CRM database can be linked with a provider client database or hosted by a provider client to facilitate access to a wider range of customer information and to permit the provider system to update the customer information.

The Coaching data category illustrated in FIG. 13B relates to end user training, support, instruction, and performance monitoring. The Adaptive Workspace System can include a Coaching software application that interfaces with the Learn API and the provider Foundational Analytics system to gather and display learn data and end user performance data. An example Coaching interface is shown in FIG. 16 and can be accessed through a Workspace Menu located in the side bar menu tree 420 depicted in FIG. 4. The Coaching Interface can display learn data relating to prior training modules that have been completed, that are currently in progress, recommended, or required for a given end user. The Coaching Interface can further display end user performance information as determined from an analysis of event data, presence or state data, ACD data, or other data sources. Performance data can include, but is not limited to, the number of calls fielded during a shift, average handle time, number of support requests submitted, sales volume, or a variety of other performance metrics. The Coaching process can also gather and display coaching data relating to coaching administered by an end user computing device (typically a supervisor computing device), such as the number of MicroTasks assigned, the number of screen shares initiated, the number of support requests answered, the number of Barge functions initiated, among other relevant metrics.

Figure 18:
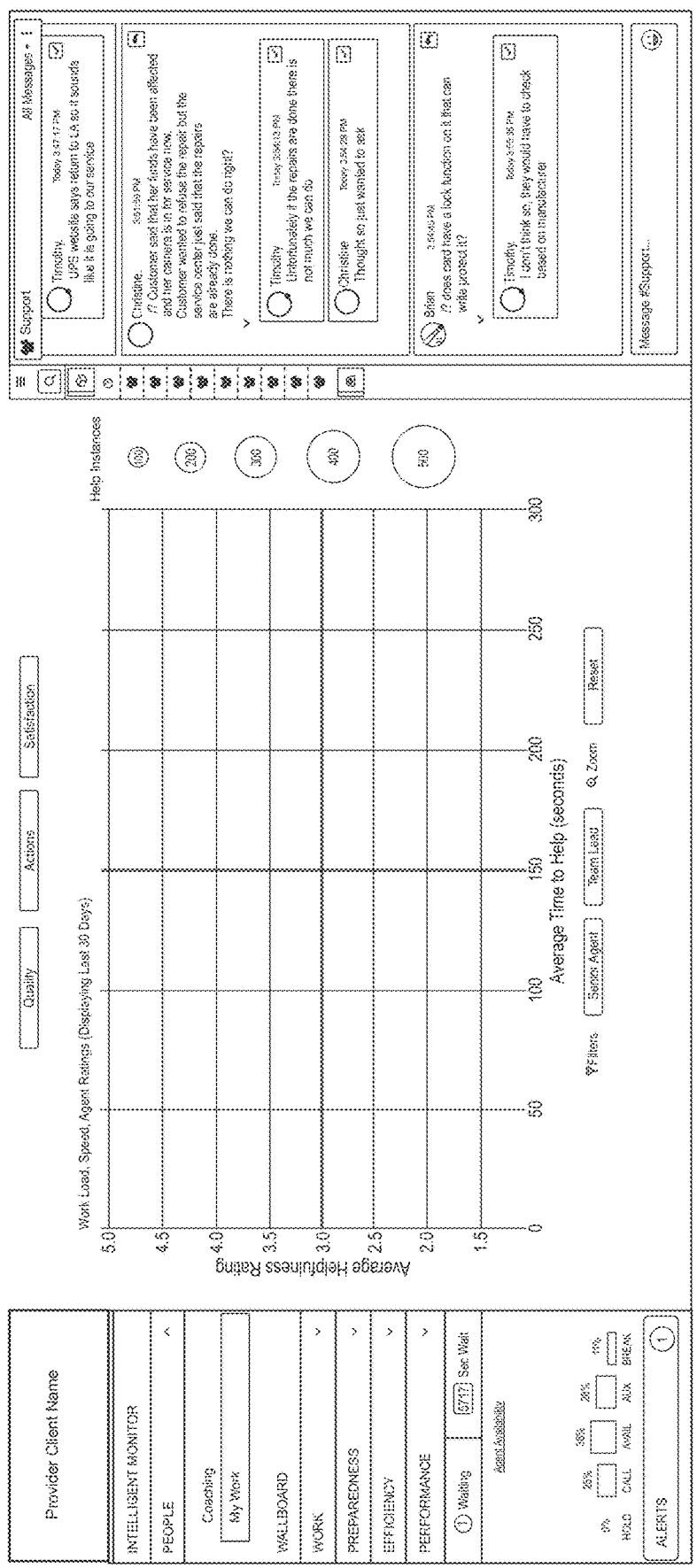
FIG. 18 illustrates an example Support Quality interface.

The Support Quality and Actions outflow data category depicted in FIG. 13B relates display of the support request data utilized as part of generating the Recommendation Matrix, such as the rating data and response time data. An example Support Quality interface is shown in FIG. 18 and can be accessed through a My Work option on a Workspace Menu located in the side bar menu tree 420 depicted in FIG. 4. Selection of the My Work menu option retrieves rating data and response time data from the Data Science Analytics software application for display in the Support Quality interface.

For a given end user, typically a supervisor, the Support Quality interface displays a graphical depiction of the rating data (i.e., the vertical axis in FIG. 18) versus the response time data (i.e., the horizontal axis of FIG. 18). The number of support requests answered by an end user computing devices can be depicted, for instance, by the size of the data points on the graph with larger points illustrating a larger number of support requests fielded. Notably, FIG. 18 also depicts a chat messaging interface 470 where a supervisor denoted "Timothy" is fielding support requests from agents, as indicated by the slash "/?" command entered into the chat messaging interface 470. In some embodiments, the Support Quality interface can display a Net Promotor Score ("NPS") that provides an efficient metric for evaluating end user performance based on the rating data and response time data. The NPS can be calculated as a normalized value between 0 to 1 where "1" indicates that each support request was answered within a target threshold time and received the highest rating available (e.g., a "5" on a scale of 1 to 5).

As a further tool for evaluating supervisor performance, the Support Quality and Actions outflow data category can additionally include an Actions interface display screen that depicts supervisor computing device activity during shared experiences over a given period of time. For instance, the Actions interface display screen could provide a table that includes the number of tiles viewed by a supervisor computing device, the number of alerts received, or the number of Boot, Listen, or Screen share functions performed.

The Customer Research data category shown in FIG. 13B relates to the display of customer data over a given time period for those customers that engaged in a shared experience. A Customer Data interface can be accessed by selecting the My Customers menu option on the Workspace Menu located in the side bar menu tree 420. Selection of the My Customers menu option calls a Customer Tiles API that retrieves customer data for display on the Customer Data interface. The Customer Tiles API retrieves the customer data from the provider Foundational Analytics system, including an analysis of the event data from the GTI API that is stored to the Event Database. The customer data can include a wide variety of information, such as the number of share experiences involving a particular product, Average Handle Times of shared experiences, the type of shared experience requests (e.g., technical support, sales, etc.), a customer satisfaction rating, or other useful information derived from the event data.

The Absenteeism outflow data category shown on FIG. 13B relates to the display of end user attendance data. Attendance data can be displayed on an Absenteeism interface accessible through selection of an Absenteeism menu option on the Workspace Menu located in the side bar menu tree 420. Attendance data can be determined by an electronic Workforce Management API software application ("eWFM API"). The eWFM API software application gathers attendance data over a given time period such as: (i) the number of end users scheduled to work; (ii) identifiers for end users scheduled to work; (iii) SAPL data for end users scheduled to work; and (iv) the number of end user computing devices that actually authenticated to the provider system.

The eWFM API utilizes the attendance data to determine absenteeism data based on the proportion of end user computing devices that authenticated into the provider system relative to the number of end users that were scheduled to work over a given time period. Absenteeism data can be correlated to the SAPL data to determine absenteeism rates according to provider site, account, program, line of business, client, or other relevant categories. The absenteeism data can also be calculated relative to particular end users to determine how often an end user appears for scheduled shifts.

Figure 19:
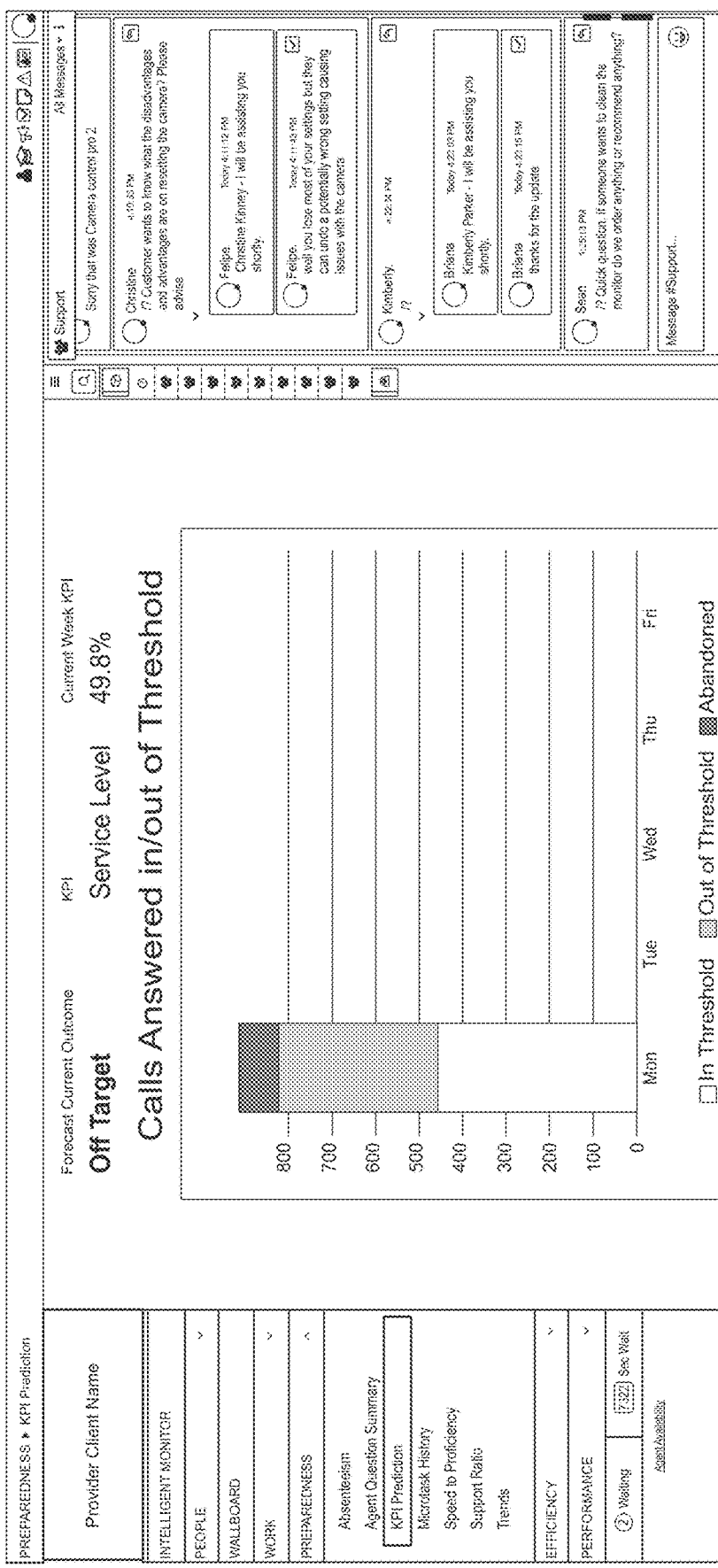
FIG. 19 illustrates an example KPI interface.

The KPI Metrics outflow data category shown in FIG. 13B relates to a wide variety of Key Performance Indicator ("KPI") data that can be displayed within a KPI interface, such as the example KPI interface depicted in FIG. 19. The KPI interface is accessed by selecting a Performance or KPI menu option from the Workspace Menu located in the side bar menu tree 420. Selection of the KPI menu option calls the Data Science Endpoints API, which retrieves data from a variety of sources, such as event data from the provider Foundational Analytics system processed by the GTI API and stored to the Event Database, end user tenure data from an Aspire database, and end user roster data from the GDW database relating to end user identifiers and corresponding supervisor identifiers.

With regard to the example KPI interface shown in FIG. 19, the KPI data displayed relates to the proportion of customer service calls answered by end users within a predetermined threshold of time (i.e., a target KPI performance metric). The example of FIG. 19 indicates that less than 50% of service calls were answered within a target threshold time, which alerts the provider to take steps to ascertain why targets were missed and what can be done to correct or improve the provider end user availability. The example KPI interface of FIG. 19 is not intended to be limiting, and those of skill in the art will appreciate that numerous other potential KPI metrics could be displayed, such as average handle time, average time to assist, or average hold time, among many others.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A computer implemented method for generating an adaptive workspace graphical user interface comprising the operations of:
    (a) receiving by a Presence Application Programming Interface (API),
        (i) first event data generated by a first event source software application running on an end user computing device, and
        (ii) second event data generated by a second event source software application running on the end user computing device;
    (b) performing by the Presence API,
        (i) a state analysis using the first event data to determine first state data for the end user computing device, and
        (ii) a state analysis using the second event data to determine second state data for the end user computing device;
    (c) receiving by an adaptive workspace point-of-presence (AWS POP) software application, (i) the first and second event data, (ii) the first and second state data generated by the Presence API, and (iii) ACD data generated by an Automated Call Distribution System;
    (d) performing a presence analysis by the AWS POP software application, wherein the presence analysis comprises the operations of
        (i) utilizing the first and second event data, the first and second state data, and ACD data to determine for the end user computing device presence data that comprises a plurality of states of the end user computing device, and
        (ii) analyzing the plurality of states of the end user computing device using the Presence API to determine state priority data designating one or more of the plurality of states to display on an adaptive workspace graphical user interface (GUI);
    (e) receiving by Workspace software code, (i) the presence data from the AWS POP software application, and (ii) end user attribute data stored to a ADA database, wherein the end user attribute data comprises an end user name correlated to the end user computing device;
    (f) generating by the Workspace software code, the adaptive workspace GUI comprising a Screen function that is displayed on the adaptive workspace GUI and a display tile for the end user computing device, wherein the display tile comprises (i) the presence data that is displayed according to the priority data, and (ii) the end user attribute data;
    (g) selecting by a first end user computing device, the Screen function to transmit a Screen request message to a OneWatch Server, wherein the Screen request message comprises a target end user identifier and a first end user identifier;
    (h) transmitting by the OneWatch Server, a screen share command to an End User Desktop OneWatch Application running on a target end user computing device;
    (i) transmitting by the End User Desktop OneWatch Application, in response to the screen share command, screen share video data to the OneWatch Server; and
    (j) receiving by the first end user computing device, the screen share video data from the OneWatch Server.

2. The computer implemented method of claim 1, wherein:
    (a) the operation of generating by the Workspace software code, the adaptive workspace GUI further comprises the operations of generating a Listen function that is displayed on the adaptive workspace GUI; and
    (b) wherein the method further comprises the operations of
        (i) selecting by the first end user computing device, the Listen function to transmit a Listen request message to a computer telephony interface application programming interface (CTI API), wherein the Listen request message comprises the target end user identifier and the first end user identifier,
        (ii) transmitting by the CTI API, a Listen command to the ACD System, and
        (iii) processing by the ACD system, the Listen command to transmit audio data from an ongoing telephone call in which a target end user is a participant to a first end user audio output.

3. The computer implemented method of claim 1, wherein:
    (a) the operation of generating by the Workspace software code, the adaptive workspace GUI further comprises the operations of generating a Barge function that is displayed on the adaptive workspace GUI; and
    (b) wherein the method further comprises the operations of
        (i) selecting by the first end user computing device, the Barge function to transmit a Barge request message to a computer telephony interface application programming interface (CTI API), wherein the Barge request message comprises the target end user identifier and the first end user identifier,
        (ii) transmitting by the CTI API, a Barge command to the ACD System, and
        (iii) processing by the ACD System, the Barge command to connect a first end user telephone interface that is coupled with the first end user computing device to an ongoing telephone call in which a target end user is a participant, wherein a first end user associated with the first end user computing device can participate in the ongoing telephone call and control the ongoing telephone call with the adaptive workspace GUI.

4. The computer implemented method of claim 1 further comprising the operations of:
    (a) receiving by an AWS Tile Feed software application event data and ACD data;
    (b) conducting a performance analysis by the AWS Tile Feed software application using the event data and the ACD data to determine performance data for the end user computing device;
    (c) receiving by the Workspace software code, the performance data; and
    (d) wherein the operation of generating by the Workspace software code, the adaptive workspace GUI, further comprises the operation of incorporating the performance data into the adaptive workspace GUI.

5. The computer implemented method of claim 1 further comprising the operations of:
    (a) receiving by an Alert Monitor software process, the presence data from the AWS POP software application, wherein the Alert Monitor software process comprises Alert Rules Engine software code that processes the presence data to recognize at least one trigger condition;

(b) processing by the Alert Monitor software process, the presence data to generate alert data in response to the Alert Rules Engine software code recognizing a trigger condition associated with the end user computing device;

(c) receiving by the Workspace software code, the alert data; and (d) wherein the operation of generating by the Workspace software code, the adaptive workspace GUI further comprises the operations of (i) generating an Alert Indicator in response to the alert data, and (ii) incorporating the Alert Indicator into the adaptive workspace GUI.

6. The computer implemented method of claim 5, wherein the Workspace software code incorporates the Alert Indicator into the adaptive workspace GUI by performing at least one of the following operations, (i) changing a color of the display tile for the end user computing device, (ii) changing a position of the display tile for the end user computing device, or (iii) incorporating an alert icon within the display tile for the end user computing device.

7. The computer implemented method of claim 1 further comprising the operations of:

(a) receiving by a Customer Tiles API event data generated by a customer data event source software application running on the end user computing device;

(b) processing the event data by the Customer Tiles API to determine customer data;

(c) receiving by the Workspace software code, the customer data; and (d) wherein the operation of generating by the Workspace software code the adaptive workspace GUI, further comprises the operation of incorporating the customer data into the adaptive workspace GUI.

8. The computer implemented method of claim 1, wherein the Presence Rules Engine software is implemented as a matrix that maps the plurality of states according to priority.

9. A computer implemented method for generating an adaptive workspace graphical user interface comprising the operations of:

(a) Clock Monitor event data generated by a Clock Monitor event source software application running on the end user computing device, (b) performing a presence analysis by the AWS POP software application, wherein the presence analysis comprises the operations of
   (i) utilizing the first and second event data, the first and second state data, and ACD data to determine for the end user computing device presence data that comprises a plurality of states of the end user computing device,
   (ii) analyzing the plurality of states of the end user computing device using the Presence API to determine state priority data designating one or more of the plurality of states to display on an adaptive workspace graphical user interface (GUI), and
   (iii) performing the presence analysis using the Clock Monitor event data to determine a Clock Monitor presence data value;

(c) receiving by Workspace software code, (i) the presence data from the AWS POP software application, (ii) end user attribute data stored to a ADA database, wherein the end user attribute data comprises an end user name correlated to the end user computing device, and (iii) the Clock Monitor presence data value;

(d) generating by the Workspace software code, the adaptive workspace GUI comprising incorporating the Clock Monitor presence data value into the adaptive workspace GUI and a display tile for the end user computing device, wherein the display tile comprises (i) the presence data that is displayed according to the priority data, and (ii) the end user attribute data;

(e) receiving by an Alert Monitor software process, the presence data from the AWS POP software application and the Clock Monitor presence data value, wherein the Alert Monitor software process comprises Alert Rules Engine software code that processes the presence data and the Clock Monitor presence data value to recognize at least one trigger condition;

(f) processing by the Alert Monitor software process, the presence data and the Clock Monitor presence data value to generate clock alert data in response to the Alert Rules Engine software code recognizing a trigger condition associated with the end user computing device;

(g) receiving by the Workspace software code, (i) clock alert data, and (ii) team roster data from the ADA Database, wherein the team roster data comprises a supervisor computing device identifier associated with the end user computing device; and (h) transmitting by Workspace software code using the supervisor computing device identifier and the clock alert data, a MicroTask to a supervisor computing device, wherein the MicroTask comprises software instructions performed by the supervisor computing device requiring communication with the end user computing device.

10. A computer implemented method for generating an adaptive workspace graphical user interface comprising the operations of:

(a) receiving by a Presence Application Programming Interface (API),
   (i) first event data generated by a first event source software application running on an end user computing device, and
   (ii) second event data generated by a second event source software application running on the end user computing device;

(b) performing by the Presence API,
   (i) a state analysis using the first event data to determine first state data for the end user computing device, and
   (ii) a state analysis using the second event data to determine second state data for the end user computing device;

(c) receiving by an adaptive workspace point-of-presence (AWS POP) software application, (i) first and second event data, (ii) the first and second state data generated by the Presence API, (iii) ACD data generated by an Automated Call Distribution System, and (iv) activity event data generated by a Secure Talk Desktop Agent (STDA) event source software application that is running on the end user computing device, wherein (i) the STDA generates the activity event data by intercepting outputs of device operating system software, (ii) the outputs are generated by end user inputs during a shared experience, and (iii) the activity data comprises from keystrokes, mouse movements, toggling between software application interfaces, opening software applications, or selecting input functions on the software applications;

(d) performing a presence analysis by the AWS POP software application, wherein the presence analysis comprises the operations of
  (i) utilizing the first and second event data, the first and second state data, ACD data, and the activity event data to determine for the end user computing device presence data that comprises a plurality of states of the end user computing device, and
  (ii) analyzing the plurality of states of the end user computing device using the Presence API to determine state priority data designating one or more of the plurality of states to display on an adaptive workspace graphical user interface (GUI);
(e) receiving by Workspace software code, (i) the presence data from the AWS POP software application, and (ii) end user attribute data stored to a ADA database, wherein the end user attribute data comprises an end user name correlated to the end user computing device; and
(f) generating by the Workspace software code, the adaptive workspace GUI comprising a display tile for the end user computing device, wherein the display tile comprises (i) the presence data that is displayed according to the priority data, and (ii) the end user attribute data.

11. A computer implemented method for generating an adaptive workspace graphical user interface comprising the operations of:
  (a) receiving by a Presence Application Programming Interface (API),
    (i) first event data generated by a first event source software application running on an end user computing device, and
    (ii) second event data generated by a second event source software application running on the end user computing device;
  (b) performing by the Presence API,
    (i) a state analysis using the first event data to determine first state data for the end user computing divide, and
    (ii) a state analysis using the second event data to determine second state data for the end user computing device;
  (c) receiving by an adaptive workspace point-of-presence (AWS POP) software application, (i) first and second event data, (ii) the first and second state data generated by the Presence API, and (iii) ACD data generated by an Automated Call Distribution System;
  (d) performing a presence analysis by the AWS POP software application, wherein the presence analysis comprises the operations of
    (i) utilizing the first and second event data, the first and second state data, and ACD data to determine for the end user computing device presence data that comprises a plurality of states of the end user computing device, and
    (ii) analyzing the plurality of states of the end user computing device using the Presence API to determine state priority data designating one or more of the plurality of states to display on an adaptive workspace graphical user interface (GUI);
  (e) receiving by an Internet Protocol (IP) Location Lookup API, IP address data for the end user computing device;
  (f) processing by the IP Location Lookup API, the IP address data to determine current location data for the end user computing device;
  (g) receiving by a Compliance API, (i) the current location data, and (ii) expected location data from an ADA Database;
  (h) performing a location analysis by the Compliance API using the current location data and the expected location data, wherein the Compliance API conducts the location analysis using Location Compliance Rules Engine software code to recognize the presence of a location trigger condition that generates location alert data;
  (i) receiving by Workspace software code, (i) the presence data from the AWS POP software application, (ii) end user attribute data stored to the ADA database, wherein the end user attribute data comprises an end user name correlated to the end user computing device, and (iii) the location alert data; and
  generating by the Workspace software code, the adaptive workspace GUI comprising a display tile for the end user computing device, wherein the display tile comprises (i) the presence data that is displayed according to the priority data, and (ii) the end user attribute data, and comprising incorporating the location alert data into the adaptive workspace GUI
  (j).

12. A computer implemented method for generating an adaptive workspace graphical user interface comprising the operations of:
  (a) receiving by a Presence Application Programming Interface (API),
    (i) first event data generated by a first event source software application running on an end user computing device, and
    (ii) second event data generated by a second event source software application running on the end user computing device;
  (b) performing by the Presence API,
    (i) a state analysis using the first event data to determine first state data for the end user computing device, and
    (ii) a state analysis using the second event data to determine second state data for the end user computing device,
  (c) conducting a volume analysis by a Taskability API to determine availability data;
  (d) receiving by an adaptive workspace point-of-presence (AWS POP) software application, (i) first and second event data, (ii) the first and second state data generated by the Presence API, (iii) ACD data generated by an Automated Call Distribution System, and (iv) the availability data generated by the Taskability API;
  (e) performing a presence analysis by the AWS POP software application, wherein the presence analysis comprises the operations of
    (i) utilizing the first and second event data, the first and second state data, and ACD data to determine for the end user computing device presence data that comprises a plurality of states of the end user computing device, and
    (ii) analyzing the plurality of states of the end user computing device using the Presence API to determine state priority data designating one or more of the plurality of states to display on an adaptive workspace graphical user interface (GUI);
  (f) processing by the AWS POP software application, the event data, state data, and availability data to determine presence MicroTask availability data for the end user computing device;

(g) receiving by Workspace software code, (i) the presence data from the AWS POP software application, (ii) end user attribute data stored to a ADA database, wherein the end user attribute data comprises an end user name correlated to the end user computing device, and (iii) the presence MicroTask availability data; and generating by the Workspace software code, the adaptive workspace GUI comprising a display tile for the end user computing device, wherein the display tile comprises (i) the presence data that is displayed according to the priority data, and (ii) the end user attribute data, and comprising incorporating the presence MicroTask availability data into the adaptive workspace GUI (h).

13. A computer implemented method for generating an adaptive workspace graphical user interface comprising the operations of:

(a) receiving by a Presence Application Programming Interface (API),
  (i) first event data generated by a first event source software application running on an end user computing device, and
  (ii) second event data generated by a second event source software application running on the end user computing device;

(b) performing by the Presence API,
  (i) a state analysis using the first event data to determine first state data for the end user computing device, and
  (ii) a state analysis using the second event data to determine second state data for the end user computing device;

(c) receiving by an adaptive workspace point-of-presence (AWS POP) software application, (i) first and second event data, (ii) the first and second state data generated by the Presence API, and (iii) ACD data generated by an Automated Call Distribution System;

(d) performing a presence analysis by the AWS POP software application, wherein the presence analysis comprises the operations of (i) utilizing the first and second event data, the first and second state data, and ACD data to determine for the end user computing device presence data that comprises a plurality of states of the end user computing device, and (ii) analyzing the plurality of states of the end user computing device using the Presence API to determine state priority data designating one or more of the plurality of states to display on an adaptive workspace graphical user interface (GUI);

(e) receiving by Workspace software code, (i) the presence data from the AWS POP software application, (ii) end user attribute data stored to a ADA database, wherein the end user attribute data comprises an end user name correlated to the end user computing device, and (iii) a support request generated by the end user computing device;

(f) processing by the Workspace software code, the support request utilizing a Recommendation Matrix to determine a ranked list of two or more request recipient end user computing devices; and generating by the Workspace software code, the adaptive workspace GUI comprising a display tile for the end user computing device, wherein the display tile comprises (i) the presence data that is displayed according to the priority data, and (ii) the end user attribute data, and generating by the Workspace software code, the adaptive workspace GUI further comprising the operations of (i) generating a Support Request Indicator in response to the support request, (ii) incorporating the Support Request Indicator into the adaptive workspace GUI, and (iii) transmitting the adaptive workspace GUI comprising the Support Request Indicator to a highest ranked request recipient end user computing device (g).

* * * * *